US010616906B2

(12) United States Patent
Noh et al.

(10) Patent No.: US 10,616,906 B2
(45) Date of Patent: Apr. 7, 2020

(54) METHOD, APPARATUS, AND SYSTEM FOR TRANSMITTING CONTROL CHANNEL IN UNLICENSED BAND

(71) Applicant: WILUS INSTITUTE OF STANDARDS AND TECHNOLOGY INC., Seoul (KR)

(72) Inventors: Minseok Noh, Seoul (KR); Jinsam Kwak, Gyeonggi-do (KR); Juhyung Son, Gyeonggi-do (KR)

(73) Assignee: WILUS INSTITUTE OF STANDARDS AND TECHNOLOGY INC., Gyeonggi-Do (KR)

( * ) Notice: Subject to any disclaimer, the term of this patent is extended or adjusted under 35 U.S.C. 154(b) by 0 days.

(21) Appl. No.: 15/893,553

(22) Filed: Feb. 9, 2018

(65) Prior Publication Data
US 2018/0167957 A1 Jun. 14, 2018

Related U.S. Application Data

(63) Continuation of application No. PCT/KR2016/008800, filed on Aug. 10, 2016.

(30) Foreign Application Priority Data

Aug. 12, 2015 (KR) .................. 10-2015-0114136
Sep. 1, 2015 (KR) .................. 10-2015-0123520

(51) Int. Cl.
*H04W 72/12* (2009.01)
*H04L 5/00* (2006.01)
(Continued)

(52) U.S. Cl.
CPC ........... *H04W 72/12* (2013.01); *H04L 5/0048* (2013.01); *H04L 5/0053* (2013.01);
(Continued)

(58) Field of Classification Search
CPC ............ H04L 27/2601; H04L 27/2602; H04L 5/0048; H04L 5/0053; H04W 16/14;
(Continued)

(56) References Cited

U.S. PATENT DOCUMENTS 10,314,063 B2* 6/2019 Yoon ................. H04W 72/1215
2015/0373668 A1* 12/2015 Lee ..................... H04W 72/042
370/329
(Continued)

FOREIGN PATENT DOCUMENTS

| WO | 2013/019046 | 2/2013 |
| WO | 2015/113499 | 8/2015 |
| WO | 2017/026798 | 2/2017 |

OTHER PUBLICATIONS

International Search Report for PCT/KR2016/008800 dated Dec. 7, 2016 and its English translation from WIPO (published as WO 2017/026798).
(Continued)

*Primary Examiner* — Robert J Lopata
(74) *Attorney, Agent, or Firm* — Ladas & Parry, LLP

(57) ABSTRACT

A base station of a wireless communication system is disclosed. The base station comprise a communication module; and a processor. The processor is configured to transmit a radio frame divided into a plurality of subframes by using the communication module, wherein a duration of each of the plurality of subframes is 1 ms. When the base station transmits a partial subframe having a duration shorter than the duration of each of the plurality of subframes, the processor starts to transmit a control channel for scheduling data transmitted through the partial subframe at a symbol position for transmitting a reference signal.

15 Claims, 22 Drawing Sheets

(51) Int. Cl.
  *H04L 27/26* (2006.01)
  *H04W 74/08* (2009.01)
  *H04W 16/14* (2009.01)
  *H04W 88/08* (2009.01)

(52) U.S. Cl.
  CPC ...... *H04L 27/2601* (2013.01); *H04L 27/2602* (2013.01); *H04W 16/14* (2013.01); *H04W 74/08* (2013.01); *H04W 74/0808* (2013.01); *H04W 88/08* (2013.01)

(58) Field of Classification Search
  CPC . H04W 72/12; H04W 74/08; H04W 74/0808; H04W 88/08
  USPC .......................................................... 370/329
  See application file for complete search history.

(56) References Cited

U.S. PATENT DOCUMENTS

| | | | | |
|---|---|---|---|---|
| 2017/0048828 A1* | 2/2017 | Um | .................. | H04L 1/0061 |
| 2017/0048884 A1* | 2/2017 | Jung | .................. | H04L 5/001 |
| 2017/0111888 A1* | 4/2017 | Dinan | .................. | H04W 72/042 |
| 2017/0127414 A1* | 5/2017 | Yi | .................. | H04L 27/2611 |
| 2017/0230945 A1* | 8/2017 | Babaei | .................. | H04W 74/006 |
| 2017/0289818 A1* | 10/2017 | Ng | .................. | H04W 48/12 |
| 2017/0367092 A1* | 12/2017 | Kim | .................. | H04W 72/04 |
| 2018/0206129 A1* | 7/2018 | Choi | .................. | H04L 1/00 |
| 2018/0332576 A1* | 11/2018 | Oh | .................. | H04W 16/14 |
| 2019/0014591 A1* | 1/2019 | Lei | .................. | H04W 72/1289 |
| 2019/0274142 A1* | 9/2019 | Yi | .................. | H04W 72/0446 |

OTHER PUBLICATIONS

Written Opinion of the International Searching Authority for PCT/KR2016/008800 dated Dec. 7, 2016 and its English machine translation by Google Translate (published as WO 2017/026798).
Samsung, "Discussion on (E)PDCCH/PDSCH Transmission in Partial Subframe for LAA", R1-152871, 3GPP TSG RAN1 #81, Fukuoka, Japan, May 16, 2015, See sections 2.1-2.4; and figure 1.
Intel Corporation, "(E)PDCCH for LAA Downlink", R1-152648, 3GPP TSG RAN WG1 Meeting #81, Fukuoka, Japan, May 16, 2015, See pp. 1-5; and Figures 1, 2.
CMCC, "Discussion on Fractional Subframe Transmission for LAA", R1-153029, 3GPP TSG-RAN WG1 Meeting #81, Fukuoka, Japan, May 15, 2015, See p. 2, and figures 1,2.

* cited by examiner

METHOD, APPARATUS, AND SYSTEM FOR TRANSMITTING CONTROL CHANNEL IN UNLICENSED BAND

CROSS-REFERENCE TO RELATED APPLICATIONS

This application is a continuation of International Patent Application No. PCT/KR2016/008800 filed on Aug. 10, 2016, which claims the priority to Korean Patent Application No. 10-2015-0114136 filed in the Korean Intellectual Property Office on Aug. 12, 2015, and Korean Patent Application No. 10-2015-0123520 filed in the Korean Intellectual Property Office on Sep. 1, 2015, the entire contents of which are incorporated herein by reference.

TECHNICAL FIELD

The present invention relates to a wireless communication system. Specifically, the present invention relates to a method, device, and system for performing a signal in an unlicensed band.

BACKGROUND ART

In recent years, with an explosive increase of mobile traffic due to the spread of smart devices, it has been difficult to cope with data usage which increases for providing a cellular communication service only by a conventional licensed frequency spectrum or LTE-licensed frequency band.

In such a situation, a scheme that uses an unlicensed frequency spectrum or LTE-Unlicensed frequency band (e.g., 2.4 GHz band, 5 GHz band, or the like) for providing the cellular communication service has been devised as a solution for a spectrum shortage problem.

However, unlike the licensed band in which a communication service provider secures an exclusive frequency use right through a procedure such as auction, or the like, in the unlicensed band, multiple communication facilities can be used simultaneously without limit when only a predetermined level of adjacent band protection regulation is observed. As a result, when the unlicensed band is used in the cellular communication service, it is difficult to guarantee communication quality at a level provided in the licensed band and an interference problem with a conventional wireless communication device (e.g., wireless LAN device) using the unlicensed band may occur.

Therefore, a research into a coexistence scheme with the conventional unlicensed band device and a scheme for efficiently sharing a radio channel needs to be preferentially made in order to settle an LTE technology in the unlicensed band. That is, a robust coexistence mechanism (RCM) needs to be developed in order to prevent a device using the LTE technology in the unlicensed band from influencing the conventional unlicensed band device.

DISCLOSURE

Technical Problem

The present invention has been made in an effort to provide a method for efficiently transmitting a signal in a wireless communication system, in particular, a cellular wireless communication system and an apparatus therefor. Further, the present invention has been made in an effort to provide a method for efficiently transmitting a signal in a specific frequency band (e.g., unlicensed band) and an apparatus therefor. In specific, the present invention has been made in an effort to provide a method for efficiently transmitting a control channel in a specific frequency band (e.g., unlicensed band) and an apparatus therefor.

Technical objects desired to be achieved in the present invention are not limited to the aforementioned objects, and other technical objects not described above will be apparently understood by those skilled in the art from the following disclosure.

Technical Solution

According to an embodiment of present invention, a base station of a wireless communication system includes a communication module; and a processor. The processor may be configured to transmit a radio frame divided into a plurality of subframes by using the communication module, wherein a duration of each of the plurality of subframes is 1 ms, and when the base station transmits a partial subframe having a duration shorter than the duration of each of the plurality of subframes, start to transmit a control channel for scheduling data transmitted through the partial subframe at an Orthogonal Frequency Division Multiplexing (OFDM) symbol position for transmitting a reference signal.

The processor may be configured to start to transmit the partial subframe at an OFDM symbol position other than a boundary of each of the plurality of subframes.

The control channel may schedule only data transmitted later than the control channel.

The processor may be configured to transmit at least one of the plurality of subframes in consecutive to the partial frame.

The processor may be configured to transmit the reference signal at a predetermined OFDM symbol position.

The processor may be configured to start to transmit the control channel at an OFDM symbol position at which half of the duration of each of the plurality of subframes elapses from the boundary of one of the plurality of subframes.

The reference signal may be a signal for estimating a channel state of a cell in which the partial subframe is transmitted.

The processor may transmit a signal for occupying a radio resource before starting to transmit the control channel.

The signal for occupying the radio resource may indicate that the transmission of the base station starts.

According to a user equipment of a wireless communication system, the user equipment includes a communication module; and a processor. The processor may be configured to receive a radio frame divided into a plurality of subframes by using the communication module, wherein a duration of each of the plurality of subframes is 1 ms, and when the user equipment receives a partial subframe having a duration shorter than the duration of each of the plurality of subframes, monitor a reception of a control channel for scheduling data transmitted through the partial subframe starting at an Orthogonal Frequency Division Multiplexing (OFDM) symbol position for receiving a reference signal.

The processor may be configured to start to receive the partial subframe at an OFDM symbol position other than a boundary of each of the plurality of subframes.

The control channel may schedule only data transmitted later than the control channel.

The processor may be configured to receive at least one of the plurality of subframes in consecutive to the partial frame.

The processor may be configured to receive the reference signal at a predetermined OFDM symbol position.

The user equipment may be configured to receive the control channel at an OFDM symbol position at which half of the duration of each of the plurality of subframes elapses from a boundary of each of the plurality of subframes.

The reference signal is a signal for estimating a channel state of a cell in which the partial subframe is transmitted.

When the user equipment receives the partial subframe, the processor may be configured to ignore a signal received prior to the control channel.

The control channel may schedule data transmitted from a cell other than a cell in which the control channel is transmitted.

According to an embodiment of present invention a method of operating a user equipment of a wireless communication system includes receiving a radio frame divided into a plurality of subframes, wherein a duration of each of the plurality of subframes is 1 ms. The receiving of the radio frame may include when receiving a partial subframe having a duration shorter than the duration of each of the plurality of subframe, monitoring a reception of a control channel for scheduling data transmitted through the partial subframe starting at an OFDM symbol position for receiving a reference symbol.

Advantageous Effects

According to exemplary embodiments of the present invention, provided are a method for efficiently transmitting a signal in a wireless communication system, in particular, a cellular wireless communication system and an apparatus therefor. Further, provided are a method for efficiently transmitting a signal in a specific frequency band (e.g., unlicensed band) and an apparatus therefor.

Effects to be acquired in the present invention are not limited to the aforementioned effects, and other effects not described above will be apparently understood by those skilled in the art from the following disclosure.

DESCRIPTION OF DRAWINGS

In order to help understand the present invention, the accompanying drawings which are included as a part of the Detailed Description provide embodiments of the present invention and describe the technical matters of the present invention together with the Detailed Description.

MODE FOR CARRYING OUT THE INVENTION

Terms used in the specification adopt general terms which are currently widely used as possible by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it intends to be revealed that a term used in the specification should be analyzed based on not just a name of the term but a substantial meaning of the term and contents throughout the specification.

Throughout this specification and the claims that follow, when it is described that an element is "coupled" to another element, the element may be "directly coupled" to the other element or "electrically coupled" to the other element through a third element. Further, unless explicitly described to the contrary, the word "comprise" and variations such as "comprises" or "comprising", will be understood to imply the inclusion of stated elements but not the exclusion of any other elements. Moreover, limitations such as "equal to or more than" or "equal to or less than" based on a specific threshold may be appropriately substituted with "more than" or "less than", respectively in some exemplary embodiments.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), and the like. The CDMA may be implemented by a radio technology such as universal terrestrial radio access (UTRA) or CDMA2000. The TDMA may be implemented by a radio technology such as global system for mobile communications (GSM)/general packet radio service (GPRS)/enhanced data rates for GSM evolution (EDGE). The OFDMA may be implemented by a radio technology such as IEEE 802.11(Wi-Fi), IEEE 802.16(WiMAX), IEEE 802-20, evolved UTRA (E-UTRA), and the like. The UTRA is a part of a universal mobile telecommunication system (UMTS). 3$^{rd}$ generation partnership project (3GPP) long term evolution (LTE) is a part of an evolved UMTS (E-UMTS) using evolved-UMTS terrestrial radio access (E-UTRA) and LTE-advanced (A) is an evolved version of the 3GPP LTE. 3GPP LTE/LTE-A is primarily described for clear description, but technical spirit of the present invention is not limited thereto.

This application claims priority to and the benefit of Korean Patent Application Nos. 10-2015-0114136, and Nos. 10-2105-0123520 filed in the Korean Intellectual Property Office and the embodiments and mentioned items described in the respective applications are included in the Detailed Description of the present application.

Figure 1:
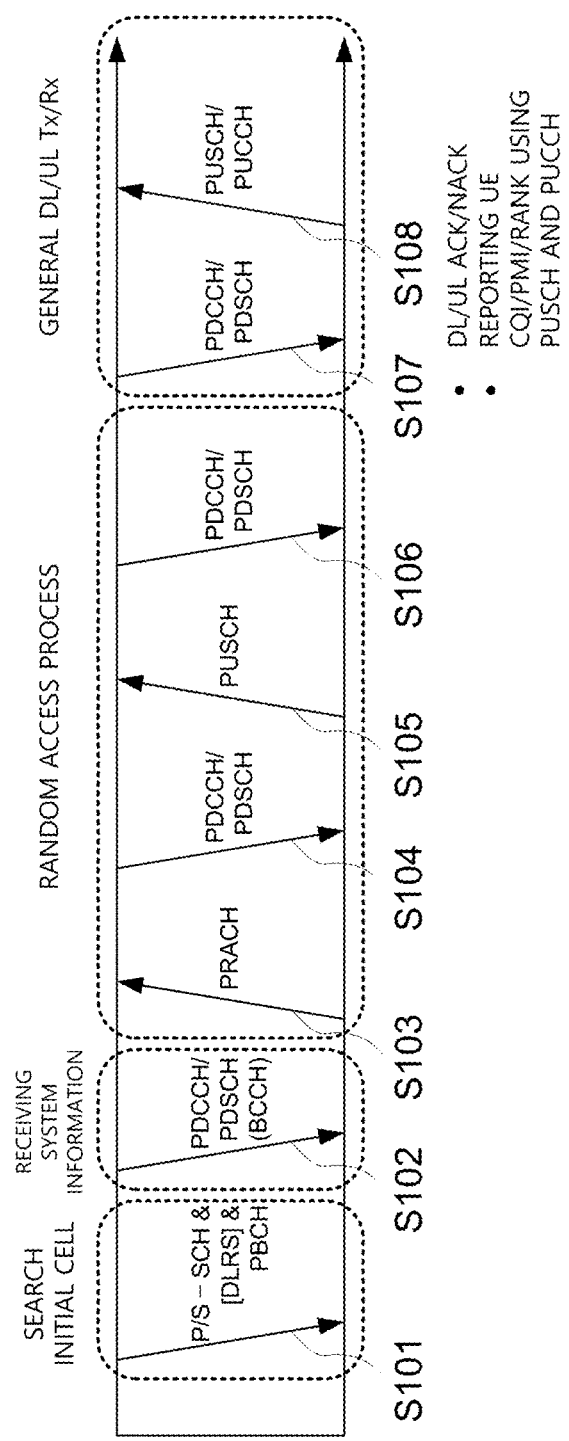
FIG. 1 illustrates physical channels used in a 3rd generation partnership project (3GPP) system and a general signal transmitting method using the physical channels.

FIG. 1 illustrates physical channels used in a 3GPP system and a general signal transmitting method using the physical channels. A user equipment receives information from a base station through downlink (DL) and the user equipment transmits information through uplink (UL) to the base station. The information transmitted/received between the base station and the user equipment includes data and various control channel and various physical channels exist according to a type/purpose of the information transmitted/received between the base station and the user equipment.

When a power of the user equipment is turned on or the user equipment newly enters a cell, the user equipment performs an initial cell search operation including synchronization with the base station, and the like (S101). To this end, the user equipment receives a primary synchronization channel (P-SCH) and a secondary synchronization channel (S-SCH) from the base station to synchronize with the base station and obtain information including a cell ID, and the like. Thereafter, the user equipment receives a physical broadcast channel from the base station to obtain intra-cell broadcast information. The user equipment receives a downlink reference signal (DL RS) in an initial cell search step to verify a downlink channel state.

The user equipment that completes initial cell search receives a physical downlink control channel (PDCCH) and a physical downlink shared channel (PDSCH) depending on information loaded on the PDCCH to obtain more detailed system information (S102).

When there is no radio resource for initially accessing the base station or signal transmission, the user equipment may perform a random access procedure (RACH procedure) to the base station (S103 to S106). Firstly, the user equipment may transmit a preamble through a physical random access channel (PRACH) (S103) and receive a response message to the preamble through the PDCCH and the PDSCH corresponding thereto (S104). When the user equipment receive a valid response message to random access, the user equipment may transmit data including an identifier of the user equipment to the base station by using the uplink (UL) grant (S105). To resolve a contention resolution, the user equipment may wait for receiving PDCCH as instruction of the base station. When the user equipment receive PDCCH by using the identifier of the user equipment (S016), random access procedure may end.

Thereafter, the user equipment may receive the PDCCH/PDSCH (S107) and transmit a physical uplink shared channel (PUSCH)/physical uplink control channel (PUCCH) (S108) as a general procedure. The user equipment receives downlink control information (DCI) through the control channel (PDCCH or E-PDCCH). The DCI includes control information such as resource allocation information to the user equipment and a format varies depending on a use purpose. The control information which the user equipment transmits to the base station is designated as uplink control information (UCI). The UCI includes an acknowledgement/negative acknowledgement (ACK/NACK), a channel quality indicator (CQI), a precoding matrix index (PMI), a rank indicator (RI), and the like. The UCI may be transmitted through the PUSCH and/or PUCCH.

Figure 2:
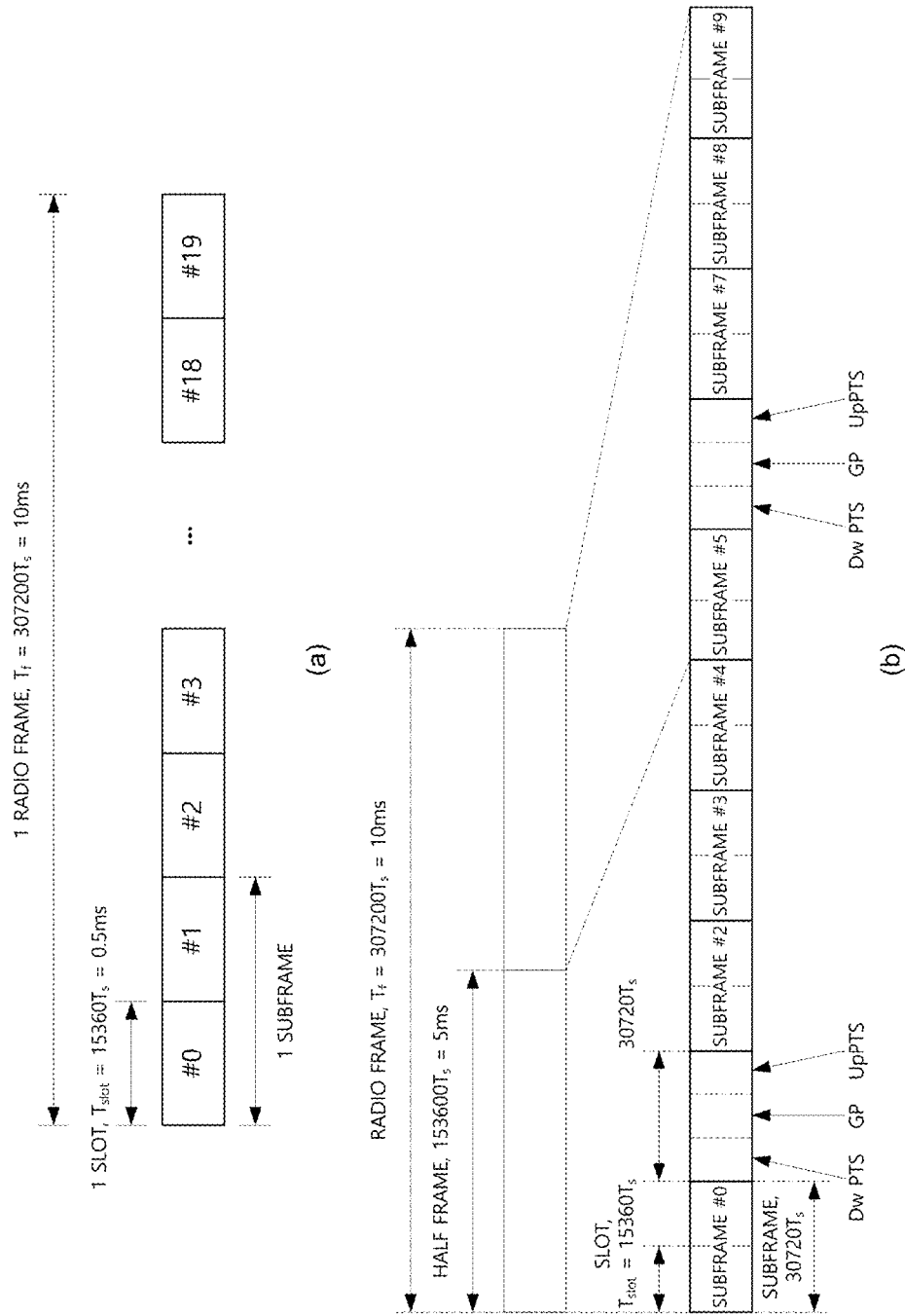
FIG. 2 illustrates one example of a radio frame structure used in a wireless communication system.

FIG. 2 illustrates one example of a radio frame structure used in a wireless communication system. FIG. 2A illustrates a frame structure for frequency division duplex (FDD) and FIG. 2B illustrates a frame structure for time division duplex (TDD).

Referring to FIG. 2, a radio frame may have a length of 10 ms (307200 Ts) and be constituted by 10 subframes (SFs). Ts represents a sampling time and is expressed as Ts=1/(2048*15 kHz). Each subframe may have a length of 1 ms and be constituted by 2 slots. Each slot has a length of 0.5 ms. 20 slots in one radio frame may be sequentially numbered from 0 to 19. A time for transmitting one subframe is defined as a transmission time interval (TTI). A time resource may be distinguished by radio frame numbers/indexes, subframe numbers/indexes #0 to #9, and slot numbers/indexes #0 to #19.

The radio frame may be configured differently according to a duplex mode. In an FDD mode, downlink transmission and uplink transmission are distinguished by a frequency and the radio frame includes only one of a downlink subframe and an uplink subframe with respect to a specific frequency band. In a TDD mode, the downlink transmission and the uplink transmission are distinguished by a time and the radio frame includes both the downlink subframe and the uplink subframe with respect to a specific frequency band. The TDD radio frame further includes special subframes for downlink and uplink switching. The special subframe includes a Downlink Pilot Time Slot (DwPTS), a guard period (GP), and an Uplink Pilot Time Slot (UpPTS).

Figure 3:
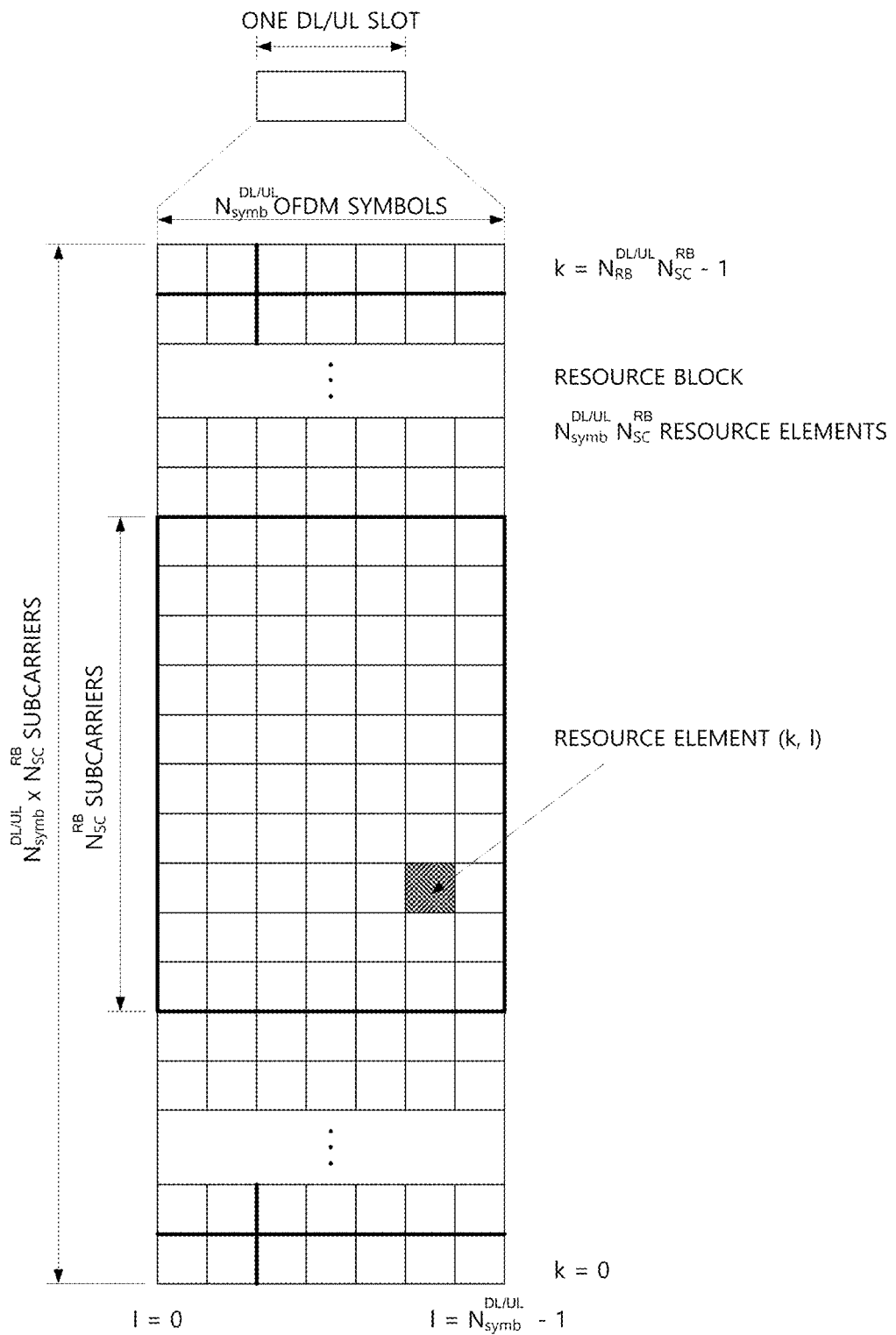
FIG. 3 illustrates one example of a downlink (DL)/uplink (UL) slot structure in the wireless communication system.

FIG. 3 illustrates a structure of a downlink/uplink slot.

Referring to FIG. 3, the slot includes a plurality of orthogonal frequency divisional multiplexing (OFDM) symbols in a time domain and a plurality of resource blocks (RBs) in a frequency domain. The OFDM symbol also means one symbol period. The OFDM symbol may be called an OFDMA symbol, a single carrier frequency division multiple access (SC-FDMA) symbol, or the like according to a multi-access scheme. The number of OFDM symbols included in one slot may be variously modified according to the length of a cyclic prefix (CP). For example, in the case of a normal CP, one slot includes 7 OFDM symbols and in the case of an extended CP, one slot includes 6 OFDM symbols. The RB is defined as $N^{DL/UL}_{symb}$ (e.g., 7) continuous OFDM symbols in the time domain and $N^{RB}_{sc}$ (e.g., 12) continuous subcarriers in the frequency domain. A resource constituted by one OFDM symbol and one subcarrier is referred to as a resource element (RE) or a tone. One RB is constituted by $N^{DL/UL}_{symb} * N^{RB}_{sc}$ resource elements.

The resource of the slot may be expressed as a resource grid constituted by $N^{DL/UL}_{RB} * N^{RB}_{sc}$ subcarriers and $N^{DL/UL}_{symb}$ OFDM symbols. Each RE in the resource grid is uniquely defined by an index pair (k, l) for each slot. k represents an index given with 0 to $N^{DL/UL}_{RB} * N^{RB}_{sc}-1$ in the frequency domain and 1 represents an index given with 0 to $N^{DL/UL}_{symb}-1$ in the time domain. Herein, $N^{DL}_{RB}$ represents the number of resource blocks (RBs) in the downlink slot and $N^{UL}_{RB}$ represents the number of RBs in the UL slot. $N^{DL}_{RB}$ and $N^{UL}_{RB}$ depend on a DL transmission bandwidth and a UL transmission bandwidth, respectively. $N^{DL}_{symb}$ represents the number of symbols in the downlink slot and $N^{UL}_{symb}$ represents the number of symbols in the UL slot. $N^{RB}_{sc}$ represents the number of subcarriers constituting one RB. One resource grid is provided per antenna port.

Figure 4:
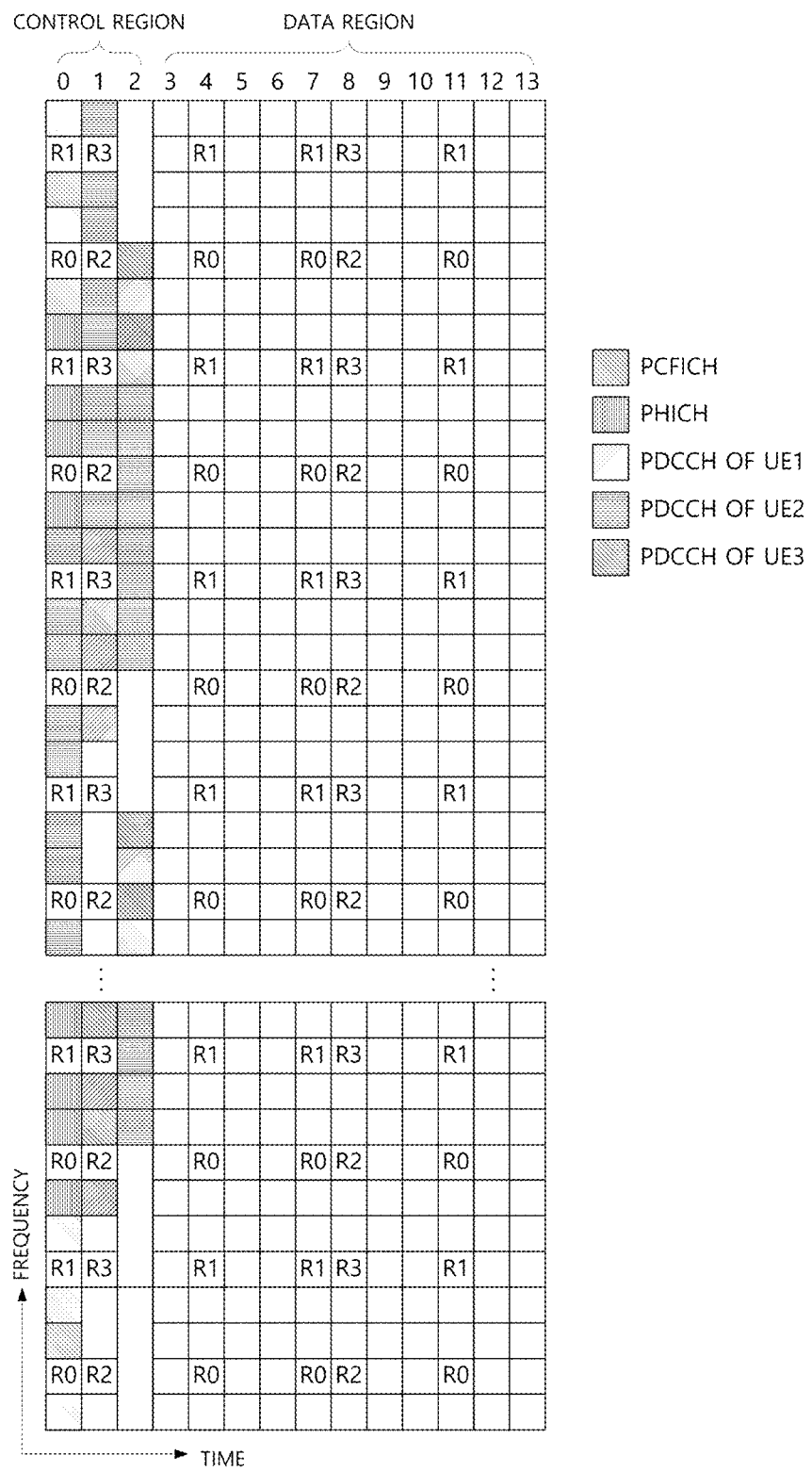
FIG. 4 illustrates a structure of a downlink subframe.

FIG. 4 illustrates a structure of a downlink subframe.

Referring to FIG. 4, the subframe may be constituted by 14 OFDM symbols. First 1 to 3 (alternatively, 2 to 4) OFDM symbols are used as a control region and the remaining 13 to 11 (alternatively, 12 to 10) OFDM symbols are used as a data region according to subframe setting. R1 to R4 represent reference signals for antenna ports 0 to 3. Control channels allocated to the control region include a physical control format indicator channel (PCFICH), a physical hybrid-ARQ indicator channel (PHICH), a physical downlink control channel (PDCCH), and the like. Data channels allocated to the data region include the PDSCH, and the like. When an enhanced PDCCH (EPDCCH) is set, the PDSCH and the EPDCCH are multiplexed by frequency division multiplexing (FDM) in the data region.

The PDCCH as the physical downlink control channel is allocated to first n OFDM symbols of the subframe. n as an integer of 1 (alternatively, 2) or more is indicated by the PCFICH. The PDCCH announces information associated with resource allocation of a paging channel (PCH) and a downlink-shared channel (DL-SCH) as transmission channels, an uplink scheduling grant, HARQ information, and the like to each user equipment or user equipment group. Data (that is, transport block) of the PCH and the DL-SCH are transmitted through the PDSCH. Each of the base station and the user equipment generally transmit and receive data through the PDSCH except for specific control information or specific service data.

Information indicating to which user equipment (one or a plurality of user equipments) the data of the PDSCH is transmitted, information indicating how the user equipments receive and decode the PDSCH data, and the like are transmitted while being included in the PDCCH/EPDCCH. For example, it is assumed that the PDCCH/EPDCCH is CRC-masked with a radio network temporary identity (RNTI) called "A" and information regarding data transmitted by using a radio resource (e.g., frequency location) called "B" and a DCI format called "C", that is, transmission format information (e.g., transport block size, modulation scheme, coding information, and the like) is transmitted through a specific subframe. In this case, a user equipment in the cell senses the PDCCH/EPDCCH by using the RNTI information thereof and when one or more user equipments having the "A" RNTI are provided, the user equipments receive the PDCCH/EPDCCH and receive the PDSCH indicated by "B" and "C" through information on the received PDCCH/EPDCCH.

Figure 5:
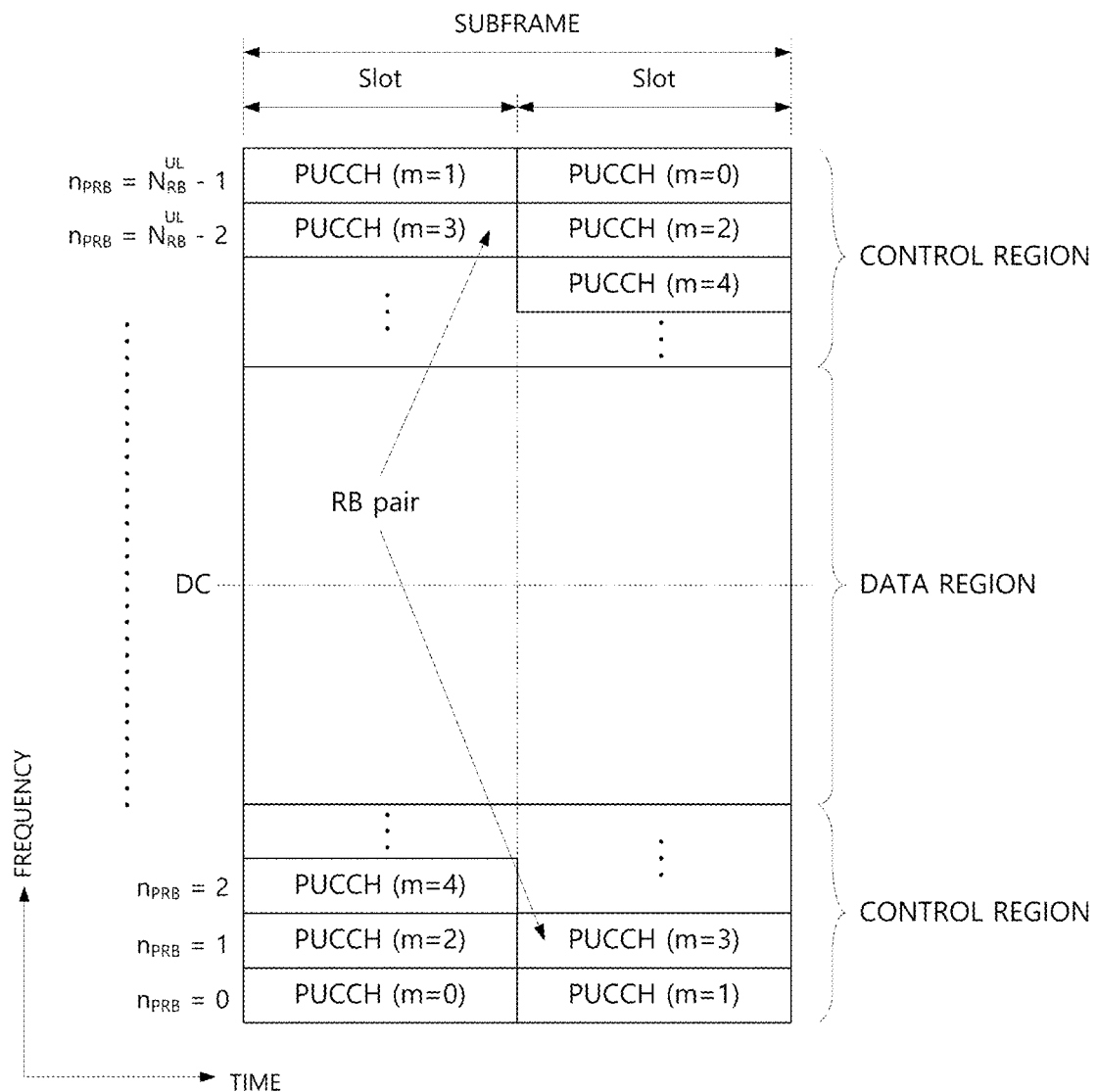
FIG. 5 illustrates a structure of an uplink subframe.

FIG. 5 illustrates a structure of an uplink subframe.

Referring to FIG. 5, the subframe may be divided into the control region and the data region in the frequency domain. The PUCCH is allocated to the control region and carries the UCI. The PUSCH is allocated to the data region and carries user data.

The PUCCH may be used to transmit the following control information.

Scheduling Request (SR): Information used to request a UL-SCH resource. The SR is transmitted by using an on-off keying (OOK) scheme.

HARQ-ACK: Response to the PDCCH and/or response to a downlink data packet (e.g., codeword) on the PDSCH. The codeword is an encoded format of the transport block. The HARQ-ACK indicates whether the PDCCH or PDSCH is successfully received. The HARQ-ACK response includes a positive ACK (simply, ACK), a negative ACK (NACK), discontinuous transmission (DTX), or the NACK/DTX. The DTX represents a case in which the user equipment misses the PDCCH (alternatively, semi-persistent scheduling (SPS) PDSCH) and the NACK/DTX means the NACK or DTX. The HARQ-ACK is mixedly used with the HARQ-ACK/NACK and the ACK/NACK.

Channel State Information (CSI): Feed-back information regarding the downlink channel. Multiple input multiple output (MIMO) related feed-back information includes the RI and the PMI.

Table 1 shows the relationship between a PUCCH format and the UCI.

TABLE 1

| PUCCH Format | Uplink control information (UCI) |
| --- | --- |
| Format 1 | Scheduling request (SR) (non-modulated waveform) |
| Format 1a | 1-bit HARQ ACK/NACK (SR existence/non-existence) |
| Format 1b | 2-bit HARQ ACK/NACK (SR existence/non-existence) |
| Format 2 | CSI (20 coded bits) |
| Format 2 | CSI and 1 or 2-bit HARQ ACK/NACK (20 bits) (corresponding to only extended CP) |
| Format 2a | CSI and 1-bit HARQ ACK/NACK (20 + 1 coded bits) |
| Format 2b | CSI and 2-bit HARQ ACK/NACK (20 + 2 coded bits) |
| Format 3 (LTE-A) | HARQ ACK/NACK + SR (48 coded bits) |

Hereinafter, carrier aggregation will be described. The carrier aggregation means a method in which the wireless communication system uses a plurality of frequency blocks as one large logical frequency band in order to use a wider frequency band. When a whole system band is extended by the carrier aggregation, a frequency band used for communication with each user equipment is defined by a component carrier (CC) unit.

Figure 6:
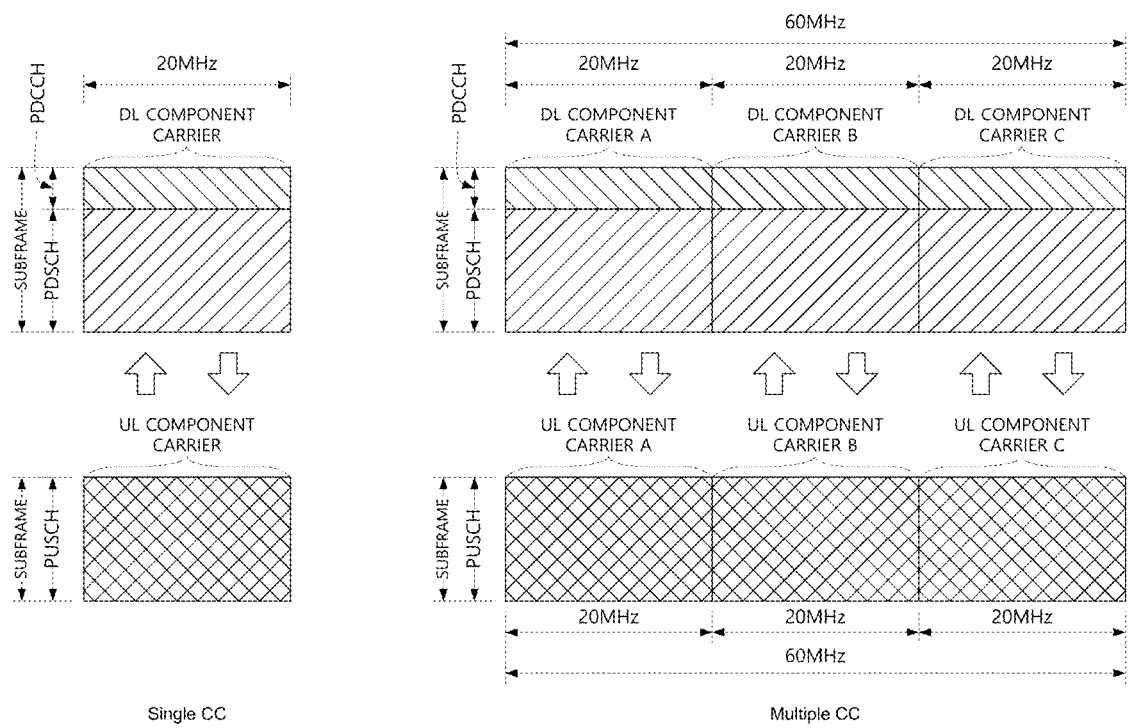
FIG. 6 is a diagram for describing single carrier communication and multi-carrier communication.

FIG. 6 is a diagram for describing single carrier communication and multi-carrier communication. FIG. 6A illustrates a subframe structure of a single carrier and FIG. 6B illustrates a subframe structure of multi-carriers which are carrier-aggregated.

Referring to FIG. 6A, in a single carrier system, the base station and the user equipment perform data communication through one DL band and one UL band corresponding thereto. The DL/UL band is divided into a plurality of orthogonal subcarriers and each frequency band operates at one carrier frequency. In the FDD, the DL and UL bands operate at different carrier frequencies, respectively and in the TDD, the DL and UL bands operate at the same carrier frequency. The carrier frequency means a center frequency of the frequency band.

Referring to FIG. 6B, the carrier aggregation is distinguished from an OFDM system that performs DL/UL communication in a base frequency band divided into a plurality of subcarriers by using one carrier frequency, in that the carrier aggregation performs DL/UL communication by using a plurality of carrier frequencies. Referring to FIG. 6B, three 20 MHz CCs are gathered in each of the UL and the DL to support a bandwidth of 60 MHz. The CCs may be adjacent to each other or non-adjacent to each other in the frequency domain. For convenience, FIG. 6B illustrates a case in which a bandwidth of a UL CC and a bandwidth of a DL CC are the same as each other and symmetric to each other, but the bandwidths of the respective CCs may be independently decided. Further, asymmetric carrier aggregation in which the number of UL CCs and the number of DL CCs are different from each other is also available. The DL/UL CC(s) are independently allocated/configured for each user equipment and the DL/UL CC(s) allocated/configured to the user equipment are designated as serving UL/DL CC(s) of the corresponding user equipment.

The base station may activate some or all of serving CCs of the user equipment or deactivate some CCs. When the base station allocates the CC(s) to the user equipment, if the CC allocation to the user equipment is wholly reconfigured or if the user equipment does not hand over, at least one specific CC among the CC(s) configured with respect to the corresponding user equipment is not deactivated. A specific CC which is always activated is referred to as a primary CC (PCC) and a CC which the base station may arbitrarily activate/deactivate is referred to as a secondary CC (SCC). The PCC and the SCC may be distinguished based on the control information. For example, specific control information may be set to be transmitted/received only through a specific CC and the specific CC may be referred to as the PCC and remaining CC(s) may be referred to as SCC(s). The PUCCH is transmitted only on the PCC.

In 3GPP, a concept of the cell is used in order to manage the radio resource. The cell is defined as a combination of the DL resource and the UL resource, that is, a combination of the DL CC and the UL CC. The cell may be configured by the DL resource only or the combination of the DL resource and the UL resource. When the carrier aggregation is supported, a linkage between the carrier frequency of the DL resource (alternatively, DL CC) and the carrier frequency of the UL resource (alternatively, UL CC) may be indicated by system information. For example, the combination of the DL resource and the UL resource may be indicated by a system information block type 2 (SIB2) linkage. The carrier frequency means a center frequency of each cell or CC. A cell corresponding to the PCC is referred to as the primary cell (PCell) and a cell corresponding to the SCC is referred to as the secondary cell (SCell). A carrier corresponding to the PCell is a DL PCC in the downlink and a carrier corresponding to the PCell is a UL PCC in the uplink. Similarly, a carrier corresponding to the SCell is a DL SCC in the downlink and a carrier corresponding to the SCell is a UL SCC in the uplink. According to a user equipment capability, the serving cell(s) may be constituted by one PCell and 0 or more SCells. For a user equipment which is in an RRC_CONNECTED state, but does not have any configuration for the carrier aggregation or does not support the carrier aggregation, only one serving cell constituted by only the PCell is present.

Figure 7:
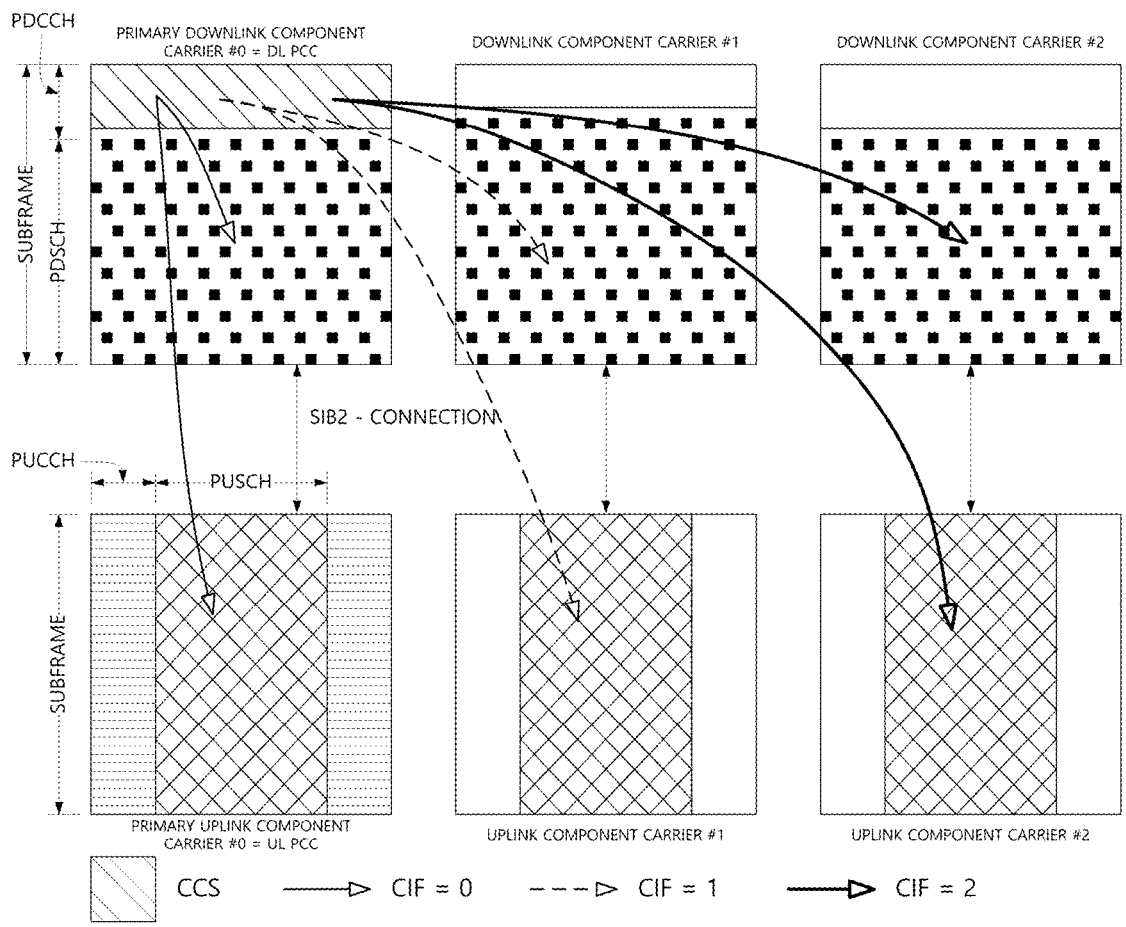
FIG. 7 illustrates an example in which a cross carrier scheduling technique is applied.

FIG. 7 illustrates an example in which cross carrier scheduling is applied. When the cross carrier scheduling is configured, a control channel transmitted through a first CC may schedule a data channel transmitted through the first CC or a second CC by using a carrier indicator field (CIF). The CIF is included in the DCI. In other words, a scheduling cell is configured, and a DL grant/UL grant transmitted in a PDCCH area of the scheduling cell schedules the PDSCH/PUSCH of a scheduled cell. That is, a search space for a plurality of component carriers is present in the PDCCH area of the scheduling cell. The PCell may be basically the scheduling cell and a specific SCell may be designated as the scheduling cell by an higher layer.

In FIG. 7, it is assumed that three DL CCs are aggregated. Herein, DL component carrier #0 is assumed as the DL PCC (alternatively, PCell) and DL component carrier #1 and DL component carrier #2 are assumed as the DL SCC (alternatively, SCell). Further, it is assumed that the DL PCC is set as a PDCCH monitoring CC. When the CIF is disabled, the respective DL CCs may transmit only the PDCCH that schedules the PDSCH thereof without the CIF according to an LTE PDCCH rule (non-cross carrier scheduling or self-carrier scheduling). On the contrary, when the CIF is enabled by UE-specific (alternatively, UE-group-specific or cell-specific) higher layer signaling, a specific CC (e.g., DL PCC) may transmit the PDCCH scheduling the PDSCH of DL CC A and the PDCCH scheduling the PDSCH of another CC by using the CIF (cross-carrier scheduling). On the contrary, in another DL CC, the PDCCH is not transmitted.

Figure 8:
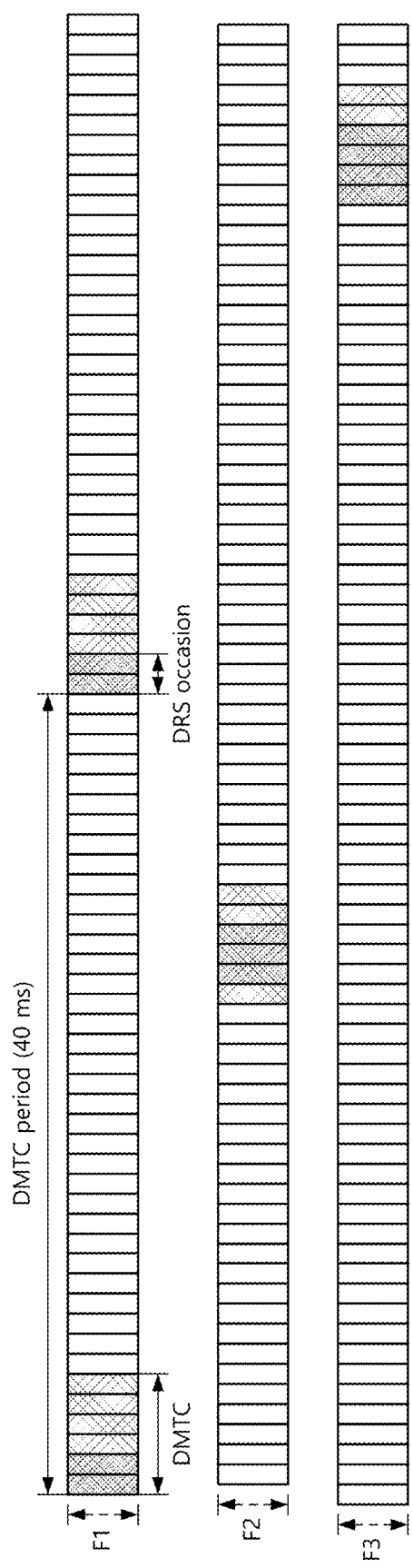
FIG. 8 illustrates Discovery Reference Signal (DRS) transmission.
Figure 9:
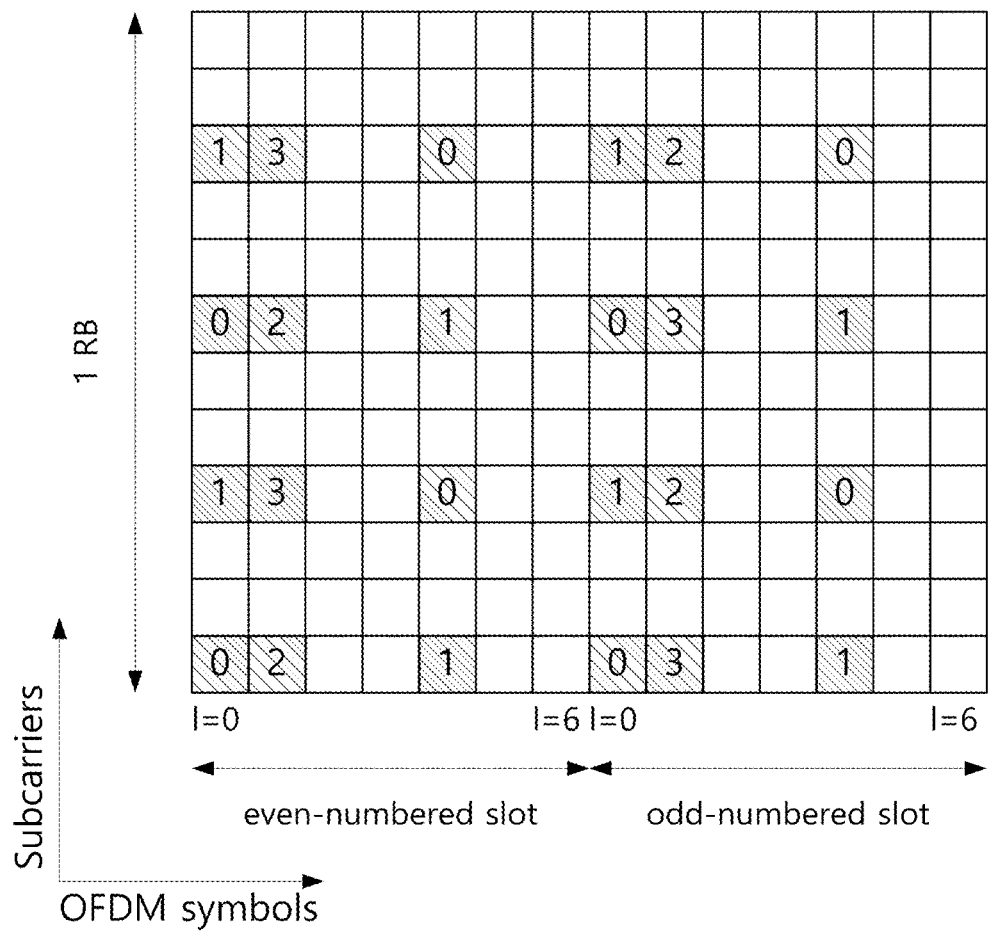
FIGS. 9 to 11 illustrate the structure of a reference signal used as DRS.
Figure 10:
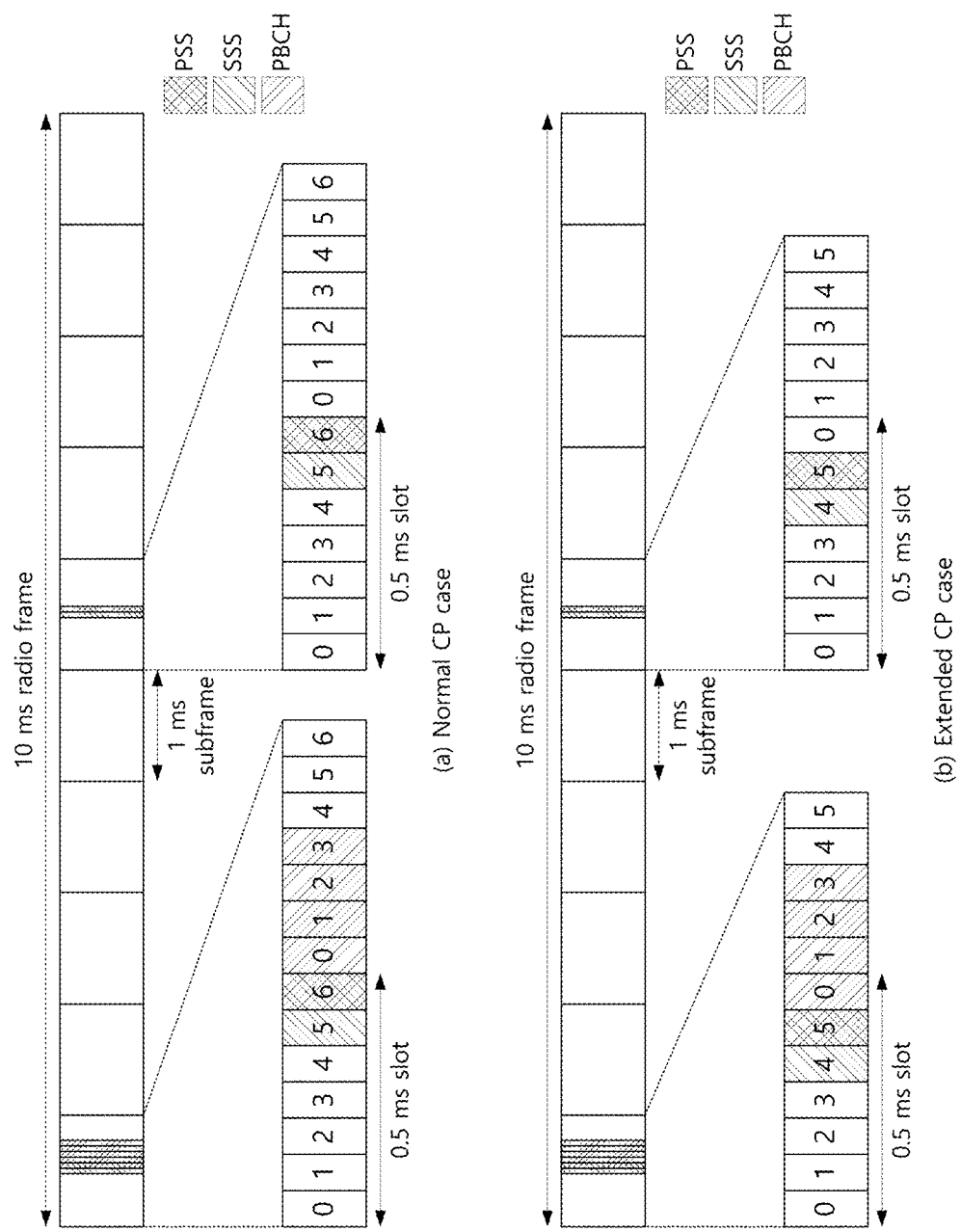
Figure 11:
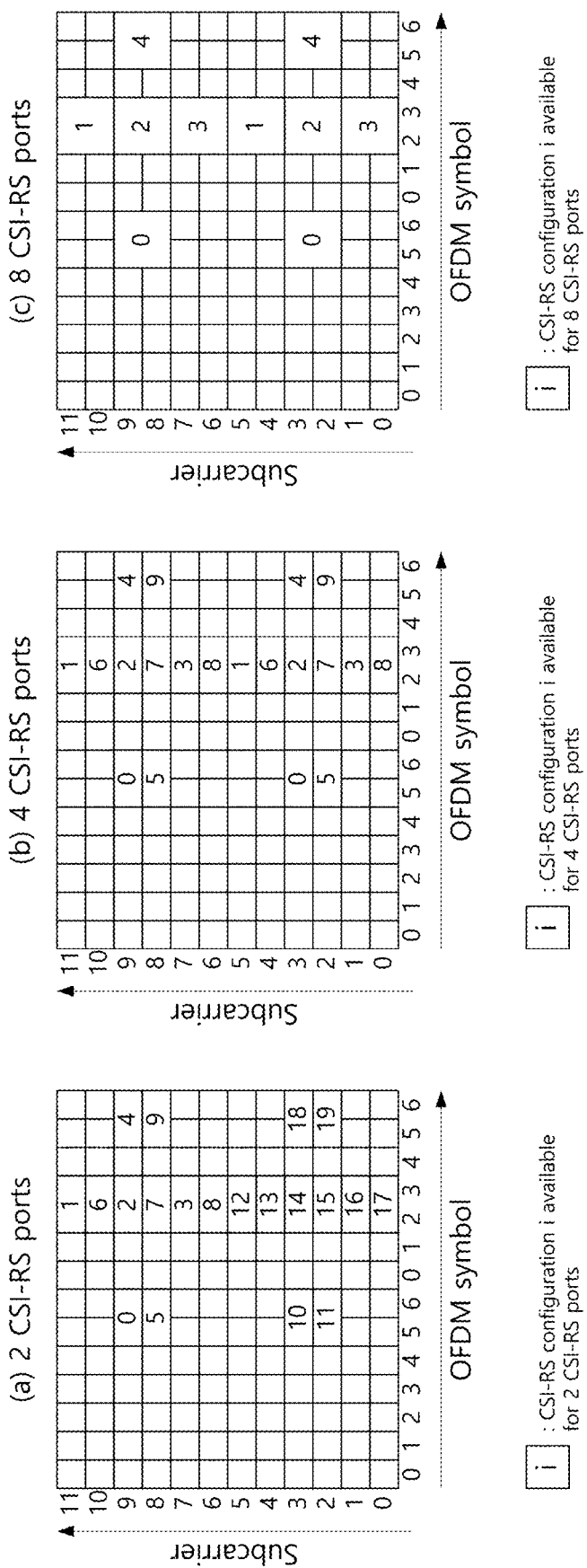

Hereinafter, DRS transmission in a licensed band will be described with reference to FIGS. 8 to 11. FIG. 8 illustrates DRS transmission, and FIGS. 9 to 11 illustrate a structure of a reference signal used in DRS. For convenience, DRS in the licensed band is referred to as Rel-12 DRS. DRS supports small cell on/off, and a SCell that is not active for any user equipment may be turned off except for DRS periodic transmission. Also, based on the DRS, a user equipment may obtain cell identification information, measure Radio Resource Management (RRM), and obtain downlink synchronization.

Referring to FIG. 8, a Discovery Measurement Timing Configuration (DMTC) indicates a time window in which a user equipment expects to receive DRS. The DMTC is fixed at 6 ms. The DMTC period is the transmission period of the DMTC, and may be 40 ms, 80 ms, or 160 ms. The position of the DMTC is specified by the DMTC transmission period and the DMTC offset (in units of subframes), and these information are transmitted to the user equipment through higher layer signaling (e.g., RRC signaling). DRS transmissions occur at the DRS occasion within the DMTC. The DRS occasion has a transmission period of 40 ms, 80 ms or 160 ms, and the user equipment may assume that there is one DRS occasion per DMTC period. The DRS occasion includes 1 to 5 consecutive subframes in the FDD radio frame and 2 to 5 consecutive subframes in the TDD radio frame. The length of the DRS occasion is delivered to the user equipment via higher layer signaling (e.g., RRC signaling). The user equipment may assume DRS in the DL subframe in the DRS occasion. DRS occasion may exist anywhere in the DMTC, but the user equipment expects the transmission interval of DRSs transmitted from the cell to be fixed (i.e., 40 ms, 80 ms, or 160 ms). That is, the position of the DRS occasion in the DMTC is fixed per cell. The DRS is configured as follows.

Cell-specific Reference Signal (CRS) at antenna port 0 (see FIG. 9): It exists in all downlink subframes within the DRS occasion, and in the DwPTS of all the special subframes. The CRS is transmitted in the entire band of the subframe.
  Primary Synchronization Signal (PSS) (see FIG. 10): In the case of FDD radio frame, it exists in the first subframe in DRS occasion, or in the second subframe in DRS occasion in the case of TDD radio frame. The PSS is transmitted in the seventh (or sixth) OFMDA symbol of the subframe and mapped to six RBs (=72 subcarriers) close to the center frequency.
  Secondary Synchronization Signal (SSS) (see FIG. 10): It exists in the first subframe in the DRS occasion. The SSS is transmitted in the sixth (or fifth) OFMDA symbol of the subframe and mapped to six RBs (=72 subcarriers) close to the center frequency.

non-zero-power Channel State Information (CSI)-RS (see FIG. 11): It exists in zero or more subframes in the DRS occasion. The position of the non-zero-power CSI-RS is variously configured according to the number of CSI-RS ports and the higher layer configuration information.

FIG. 8 illustrates a case where the DRS reception time is set to a separate DMTC for each frequency in a user equipment's situation. Referring to FIG. 8, in the case of frequency F1, a DRS occasion with a length of 2 ms is transmitted every 40 ms, in the case of frequency F2, a DRS occasion with a length of 3 ms is transmitted every 80 ms, and in the case of frequency F3, a DRS occasion with a length of 4 ms is transmitted every 80 ms. The user equipment may know the starting position of the DRS occasion in the DMTC from the subframe including the SSS. Here, the frequencies F1 to F3 may be replaced with corresponding cells, respectively.

Embodiment: DRS Transmission Scheme in Unlicensed Band

Figure 12:
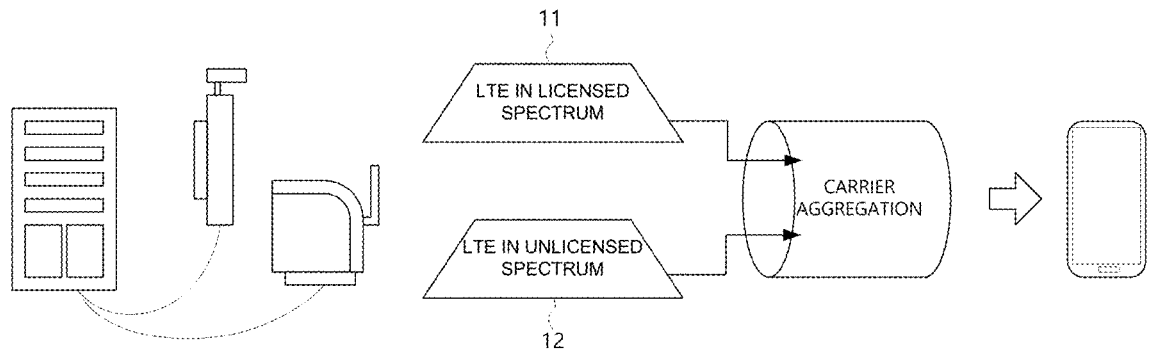
FIG. 12 illustrates a Licensed Assisted Access (LAA) service environment.

FIG. 12 illustrates a Licensed Assisted Access (LAA) service environment. Referring to FIG. 12, a service environment in which LTE technology 11 in the existing licensed band and LTE-Unlicensed (LTE-U), i.e., LTE technology 12 in the unlicensed band currently being actively discussed, or LAA are incorporated may be provided to a user.

Figure 13:
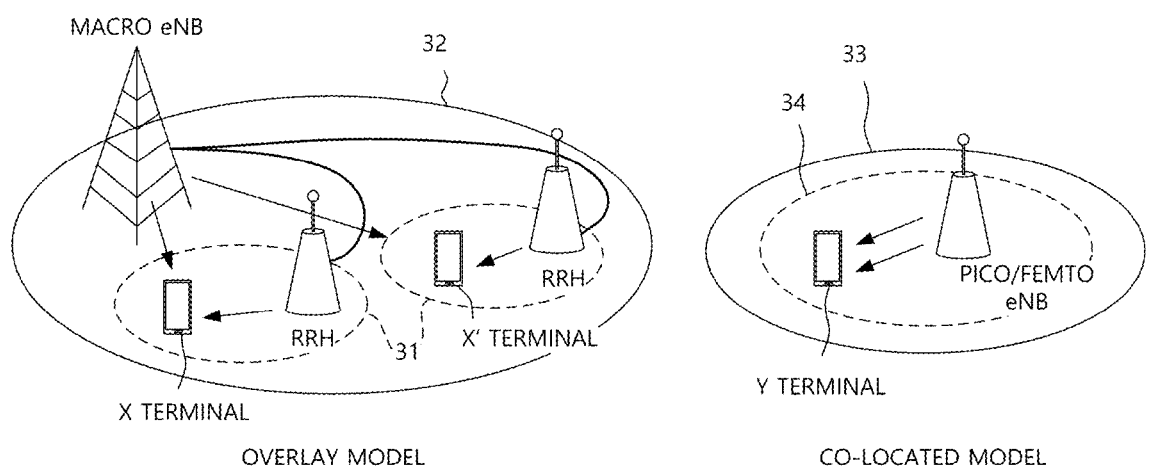
FIG. 13 illustrates a deployment scenario of a user equipment and a base station in an LAA service environment.

FIG. 13 illustrates a deployment scenario of a user equipment and a base station in an LAA service environment.

A frequency band targeted by the LAA service environment has short radio communication range due to the high frequency characteristics. Considering this, the deployment scenario of the user equipment and the base station may be an overlay model or a co-located model in an environment in which coexist the existing LTE-L service and LAA service.

In the overlay model, a macro base station may perform wireless communication with an X UE and an X' UE in a macro area (32) by using a licensed carrier and be connected with multiple radio remote heads (RRHs) through an X2 interface. Each RRH may perform wireless communication with an X UE or an X' UE in a predetermined area (31) by using an unlicensed carrier. The frequency bands of the macro base station and the RRH are different from each other not to interfere with each other, but data needs to be rapidly exchanged between the macro base station and the RRH through the X2 interface in order to use the LAA service as an auxiliary downlink channel of the LTE-L service through the carrier aggregation.

In the co-located model, a pico/femto base station may perform the wireless communication with a Y UE by using both the licensed carrier and the unlicensed carrier. However, it may be limited that the pico/femto base station uses both the LTE-L service and the LAA service to downlink transmission. A coverage (33) of the LTE-L service and a coverage (34) of the LAA service may be different according to the frequency band, transmission power, and the like.

When LTE communication is performed in the unlicensed band, conventional equipments (e.g., wireless LAN (Wi-Fi) equipments) which perform communication in the corresponding unlicensed band may not demodulate an LAA message or data. Therefore, conventional equipments determine the LAA message or data as a kind of energy to perform an interference avoidance operation by an energy detection technique. That is, when energy corresponding to the LAA message or data is lower than −62 dBm or certain energy detection (ED) threshold value, the wireless LAN equipments may perform communication by disregarding the corresponding message or data. As a result, that user equipment which performs the LTE communication in the unlicensed band may be frequently interfered by the wireless LAN equipments.

Therefore, a specific frequency band needs to be allocated or reserved for a specific time in order to effectively implement an LAA technology/service. However, since peripheral equipments which perform communication through the unlicensed band attempt access based on the energy detection technique, there is a problem in that an efficient LAA service is difficult. Therefore, a research into a coexistence scheme with the conventional unlicensed band device and a scheme for efficiently sharing a radio channel needs to be preferentially made in order to settle the LAA technology. That is, a robust coexistence mechanism in which the LAA device does not influence the conventional unlicensed band device needs to be developed.

Figure 14:
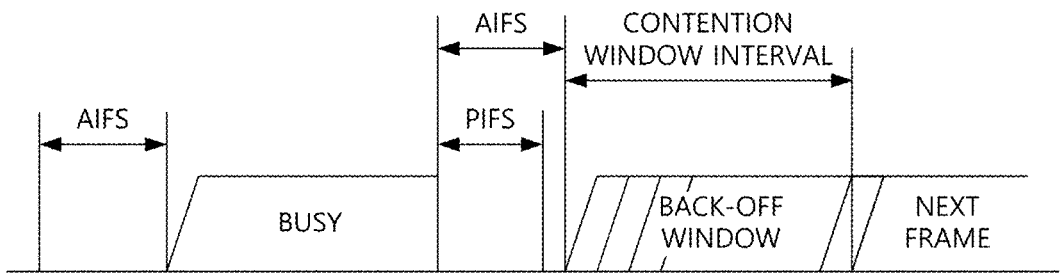
FIG. 14 illustrates a conventional communication scheme operating in an unlicensed band.

FIG. 14 illustrates a conventional communication scheme (e.g., wireless LAN) operating in an unlicensed band. Since most devices that operate in the unlicensed band operate based on listen-before-talk (LBT), a clear channel assessment (CCA) technique that senses a channel before data transmission is performed.

Referring to FIG. 14, a wireless LAN device (e.g., AP or STA) checks whether the channel is busy by performing carrier sensing before transmitting data. When a predetermined strength or more of radio signal is sensed in a channel to transmit data, it is determined that the corresponding channel is busy and the wireless LAN device delays the access to the corresponding channel. Such a process is referred to as clear channel evaluation and a signal level to decide whether the signal is sensed is referred to as a CCA threshold. Meanwhile, when the radio signal is not sensed in the corresponding channel or a radio signal having a strength smaller than the CCA threshold is sensed, it is determined that the channel is idle.

When it is determined that the channel is idle, a terminal having data to be transmitted performs a backoff procedure after a defer period (e.g., arbitration interframe space (AIFS), PCF IFS (PIFS), or the like). The defer period means a minimum time when the terminal needs to wait after the channel is idle. The backoff procedure allows the terminal to further wait for a predetermined time after the defer period. For example, the terminal stands by while decreasing a slot time for slot times corresponding to a random number allocated to the terminal in the contention window (CW) during the channel is idle, and a terminal that completely exhausts the slot time may attempt to access the corresponding channel.

When the terminal successfully accesses the channel, the terminal may transmit data through the channel. When the data is successfully transmitted, a CW size (CWS) is reset to an initial value (CWmin). On the contrary, when the data is unsuccessfully transmitted, the CWS increases twice. As a result, the terminal is allocated with a new random number within a range which is twice larger than a previous random number range to perform the backoff procedure in a next CW. In the wireless LAN, only an ACK is defined as receiving response information to the data transmission. Therefore, when the ACK is received with respect to the data transmission, the CWS is reset to the initial value and when feed-back information is not received with respect to the data transmission, the CWS increases twice.

As described above, since most communications in the unlicensed band in the related art operate based on the LBT, the LTE also considers the LBT in the LAA for coexistence with the conventional device. In detail, in the LTE, the channel access method on the unlicensed band may be divided into 4 following categories according to the presence/an application scheme of the LBT.

Category 1: No LBT
  An LBT procedure by a Tx entity is not performed.
Category 2: LBT without random backoff
  A time interval in which the channel needs to be sensed in an idle state before the Tx entity performs a transmission on the channel is decided. The random backoff is not performed.
Category 3: LBT with random backoff with a CW of fixed size
  LBT method that performs random backoff by using a CW of a fixed size. The Tx entity has a random number N in the CW and the CW size is defined by a minimum/maximum value of N. The CW size is fixed. The random number N is used to decide the time interval in which the channel needs to be sensed in an idle state before the Tx entity performs a transmission on the channel.
Category 4: LBT with random backoff with a CW of variable size
  LBT method that performs the random backoff by using a CW of a variable size. The Tx entity has the random number N in the CW and the CW size is defined by the minimum/maximum value of N. The Tx entity may change the CW size at the time of generating the random number N. The random number N is used to decide the time interval in which the channel needs to be sensed in an idle state before the Tx entity performs a transmission on the channel.

Figure 15:
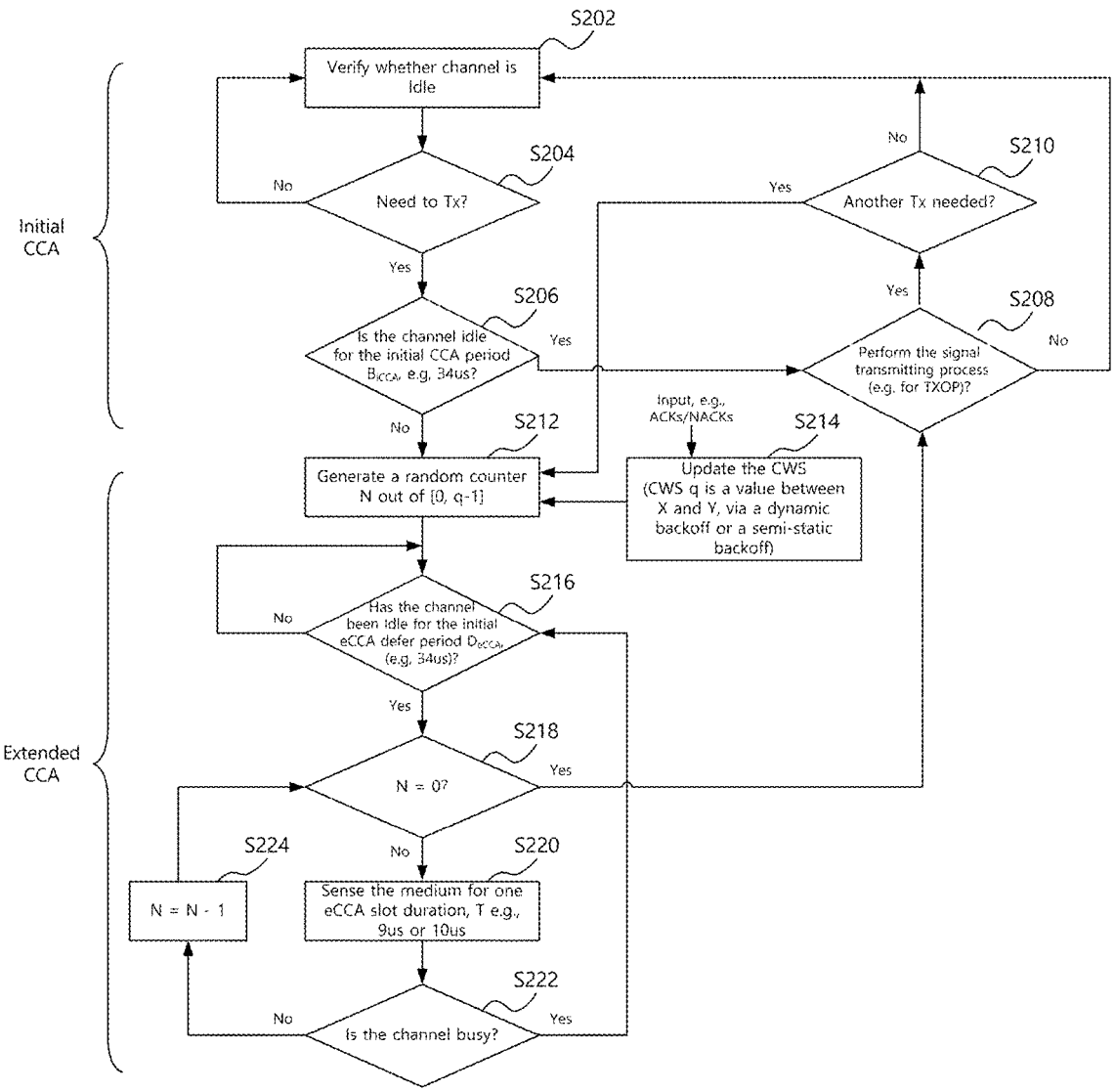
FIGS. 15 and 16 illustrate a Listen-Before-Talk (LBT) procedure for DL transmission.
Figure 16:
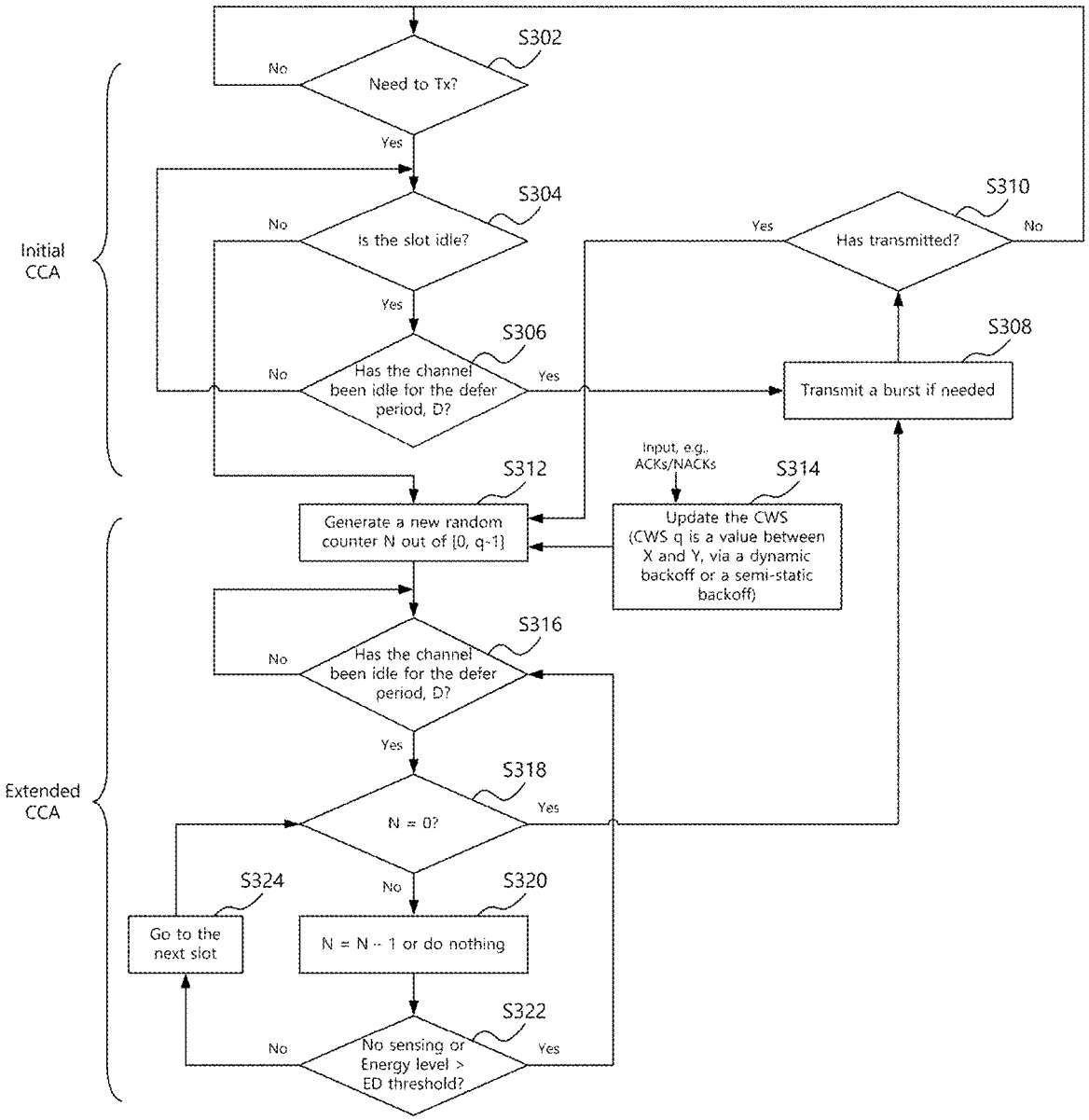

FIGS. 15 and 16 illustrate a DL transmission process based on a category 4 LBT. The category 4 LBT may be used to ensure fair channel access with Wi-Fi. Referring to FIGS. 15 and 16, the LBT process includes Initial CCA (ICCA) and Extended CCA (ECCA). That is, it is determined whether the channel is idle through the ICCA, and data transmission is performed after the ICCA period. If the interference signal is detected and data transmission fails, a data transmission time point may be obtained through a defer period+backoff counter after setting a random backoff counter.

Referring to FIG. 15, the signal transmission process may be performed as follows.

Initial CCA
  S202: The base station verifies that the channel is idle.
  S204: The base station verifies whether the signal transmission is required. When the signal transmission is not required, the process returns to S202 and when the signal transmission is required, the process proceeds to S206.
  S206: The base station verifies whether the channel is idle for an ICCA defer period (BCCA). The ICCA defer period is configurable. As an implementation example, the ICCA defer period may be constituted by an interval of 16 μs and n consecutive CCA slots. Herein, n may be a positive integer and one CCA slot interval may be 9 μs. The number of CCA slots may be configured differently according to a QoS class. The ICCA defer period may be set to an appropriate value by considering a defer period (e.g., DIFS or AIFS) of Wi-Fi. For example, the ICCA defer period may be 34 us. When the channel is idle for the ICCA defer period, the base station may perform the signal transmitting process (S208). When it is determined that the channel is busy during the ICCA defer period, the process proceeds to S212 (ECCA).
  S208: The base station may perform the signal transmitting process. When the signal transmission is not performed, the process proceeds to S202 (ICCA) and when the signal transmission is performed, the process proceeds to S210. Even in the case where a backoff counter N reaches 0 in S218 and S208 is performed, when the signal transmission is not performed, the process proceeds to S202 (ICCA) and when the signal transmission is performed, the process proceeds to S210.
  S210: When additional signal transmission is not required, the process proceeds to S202 (ICCA) and when the additional signal transmission is required, the process proceeds to S212 (ECCA).

Extended CCA
  S212: The base station generates the random number N in the CW. N is used as a counter during the backoff process and generated from [0, q-1]. The CW may be constituted by q ECCA slots and an ECCA slot size may be 9 μs or 10 μs. The CW size (CWS) may be defined as q and be variable in S214. Thereafter, the base station proceeds to S216.
  S214: The base station may update CWS. CWS q may be updated to a value between X and Y. The X and Y values are configurable parameters. The CWS update/adjustment may be performed each time N is generated (dynamic back-off) or semi-static (semi-static back-off) at certain time intervals. The CWS may be updated/adjusted based on exponential back-off or binary back-off. That is, the CWS may be updated/adjusted to a power of 2 or a multiple of 2. With respect to the PDSCH transmission, the CWS may be updated/adjusted based on the terminal's feedback/report (e.g., HARQ ACK/NACK) or updated/adjusted based on the base station sensing.
  S216: The base station determines that the channel is idle during the ECCA defer period (DeCCA). The ECCA defer period is configurable. As an embodiment, the ECCA defer period may be composed of a 16 μs section and n consecutive CCA slots. Herein, n is a positive integer and one CCA slot section may be 9 μs. The number of CCA slots may be set differently according to the QoS class. The ECCA defer period may be set to an appropriate value by considering the defer period of Wi-Fi (e.g., DIFS and AIFS). For example, the ECCA defer period may be 34 us. If the channel is idle during the ECCA defer period, the base station proceeds to S218. If the channel is determined to be busy during the ECCA defer period, the base station repeats S216.
  S218: The base station checks if N is 0. If N is 0, the base station may perform a signal transmission process (S208). In this case (i.e., N=0), the base station may continue the ECCA procedure by performing CCA checking during at least one slot without performing the transmission immediately. If N is not 0 (i.e., N>0), the process proceeds to S220.
  S220: The base station senses the channel for one ECCA slot section T. The ECCA slot size may be 9 μs or 10 μs, and the actual sensing time may be at least 4 μs.
  S222: If it is determined that the channel is idle, the process proceeds to S224. If it is determined that the channel is busy, the process returns to S216. That is, one ECCA defer period is reapplied after the channel is idle, and N does not count down during the ECCA defer period.

S224: Decrement N by 1 (ECCA countdown).

FIG. 16 is substantially the same as/similar to the transmission process of FIG. 15 and differs according to the implementation method. Therefore, the details may refer to the contents of FIG. 15.

Initial CCA

S302: The base station checks whether signal transmission is needed. If no signal transmission is required, S302 is repeated, and if signal transmission is required, the process proceeds to S304.

S304: The base station checks if the slot is idle. If the slot is idle, the process proceeds to S306. If the slot is busy, the process proceeds to S312 (ECCA). The slot may correspond to the CCA slot in FIG. 15.

S306: The base station checks that the channel is idle during the defer period D. D may correspond to the ICCA defer period in FIG. 15. If the channel is idle during the defer period, the base station may perform the signal transmission process (S308). If it is determined that the channel is busy during the defer period, the process proceeds to S304.

S308: The base station may perform the signal transmission process if necessary.

S310: If there is no signal transmission, the process proceeds to S302 (ICCA), and if there is a signal transmission, the process proceeds to S312 (ECCA). Even through the back-off counter N reaches 0 in S318 and S308 is performed, if there is no signal transmission, the process proceeds to S302 (ICCA) and if there is signal transmission, the process proceeds to S312 (ECCA).

Extended CCA

S312: The base station generates a random number N in the CW. N is used as a counter in the back-off process and is generated from [0, q-1]. The CW size CWS is defined by q and may be varied in S314. Thereafter, the base station proceeds to S316.

S314: The base station may update the CWS. CWS q may be updated to a value between X and Y. The X and Y values are configurable parameters. The CWS update/adjustment may be performed each time N is generated (dynamic back-off) or semi-static (semi-static back-off) at certain time intervals. The CWS may be updated/adjusted based on exponential back-off or binary back-off. That is, the CWS may be updated/adjusted to a power of 2 or a multiple of 2. With respect to the PDSCH transmission, the CWS may be updated/adjusted based on the user equipment's feedback/report (e.g., HARQ ACK/NACK) or updated/adjusted based on the base station sensing.

S316: The base station checks that the channel is idle during the defer period D. D may correspond to the ECCA defer period in FIG. 15. D in S306 and S316 may be the same. If the channel is idle during the defer period, the base station proceeds to S318. If the channel is determined to be busy during the defer period, the base station repeats S316.

S318: The base station checks if N is 0. If N is 0, the base station may perform a signal transmission process (S308). In this case (N=0), the base station may continue the ECCA procedure by performing CCA checking during at least one slot without performing the transmission immediately. If N is not 0 (i.e., N>0), the process proceeds to S320.

S320: The base station selects one of an operation of decrementing N by 1 (ECCA countdown) and an operation of not decrementing N (self-deferral). The self-deferral operation may be performed according to the implementation/selection of the base station. At the self-deferral time, the base station does not perform sensing for energy detection and does not perform ECCA countdown.

S322: The base station may select one of an operation not to perform sensing for energy detection and an energy detection operation. If sensing for energy detection is not performed, the process proceeds to S324. When the energy detection operation is performed, if the energy level is lower than the energy detection threshold value (i.e., idle), the process proceeds to S324. If the energy level exceeds the energy detection threshold value (i.e., busy), the process returns to S316. That is, one defer period is reapplied after the channel is idle, and N does not count down during the defer period.

S324: The process proceeds to S318.

As described above, several wireless devices approach the unlicensed band through contention. Therefore, the base station and the user equipment of the wireless communication system may access the unlicensed band through contention. At this time, if the base station and the user equipment use the unlicensed band in the same manner as the license band, the efficiency of the wireless communication may be lowered. This will be described with reference to FIG. 17.

Figure 17:
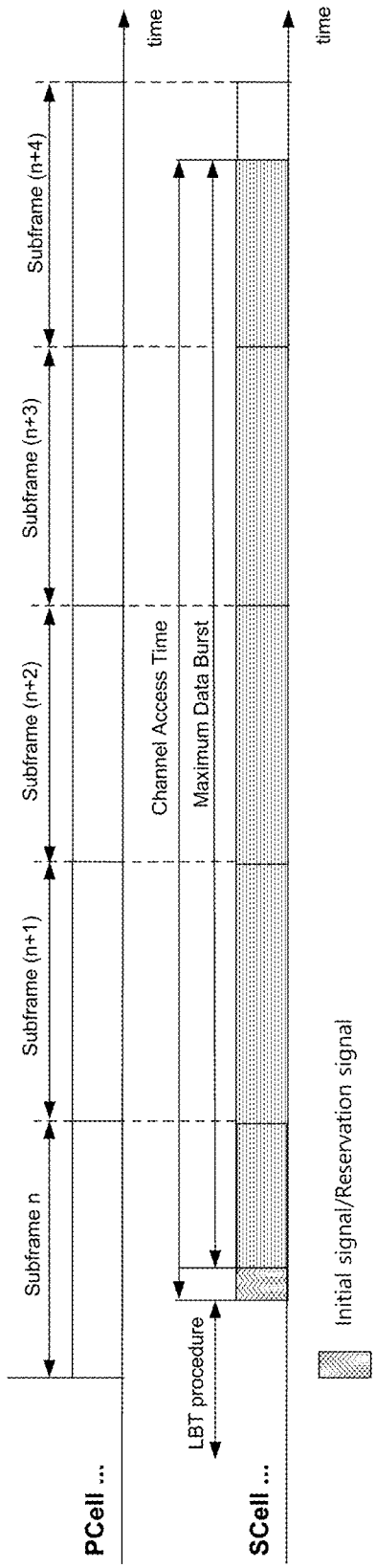
FIG. 17 shows a resource used by a base station after an LBT procedure in an unlicensed band according to an embodiment of the present invention.

FIG. 17 shows a resource used by a base station after an LBT procedure in an unlicensed band according to an embodiment of the present invention.

In a cellular wireless communication system, radio resources may be allocated in units of a subframe. At this time, the base station and the user equipment access the radio resource based on the subframe boundary. As described above, when a base station or an user equipment accesses the unlicensed band, it has to perform a contention procedure unlike the licensed band. Specifically, the base station or the user equipment may perform an LBT procedure or a channel sensing procedure to access the unlicensed band.

Specifically, as in the embodiment of FIG. 17, a base station or an user equipment may transmit a PCell in a frequency band (e.g., a license band) in which the contention procedure is not performed, and transmit an SCell in an unlicensed band. In addition, the base station or user equipment may obtain transmission opportunities through the LBT procedure in SCell. At this time, the start of the transmission opportunity on the SCell acquired by the base station or the user equipment may not match the boundaries of subframes as shown in FIG. 17. If the base station or user equipment waits after the contention procedure to access the channel based on the subframe boundaries, the base station or user equipment may lose the transmission opportunity obtained through the contention procedure to other wireless communication user equipments.

Therefore, the base station or the user equipment must schedule the transmission time point of the data channel and the control channel through a method different from that used in the license band. Specifically, the base station or the user equipment may access radio resources regardless of the subframe boundaries in the unlicensed band. In a specific embodiment, the base station or user equipment may start transmitting and receiving at any time point within the subframe in the unlicensed band. At this time, when a base station or an user equipment performs transmission during a time section shorter than one subframe, the corresponding time period is referred to as a partial subframe. In the embodiment of FIG. 17, the base station or the user equipment starts transmission in the SCell from the middle of the time section corresponding to the nth subframe Subframe n of the PCell.

Also, in the case of the unlicensed band, the maximum time that the wireless communication device may occupy the wireless resources may be limited. Therefore, the base station or user equipment may transmit a partial subframe at the end of transmission. In the embodiment of FIG. 17, the base station or the user equipment ends the transmission in the SCell in the middle of the time section corresponding to the n+4th subframe Subframe n+4 of the PCell.

In addition, the base station or the user equipment may transmit a signal to occupy radio resources before starting transmission. At this time, the signal for occupying the radio resource may be at least one of an initial signal indicating the start of transmission, a reservation signal including no information, an LAA preamble, and DRS. In this case, DRS may be Rel-12 DRS, or may be a combination of PSS, SSS, CRS, CSI-RS or a corresponding subset. Also, the signal for occupying the radio resource may be for matching the OFDM symbol granularity of the signal transmitted from the base station or the user equipment.

The operation of the base station and the user equipment in the unlicensed band will be described in detail with reference to FIGS. 18 to 23. In particular, an embodiment in which the base station transmits data to the user equipment in the unlicensed band will be described with reference to FIGS. 18 to 23. Meanwhile, the base station in the specification may represent at least one of a transmission point (TP), an access point (AP), and a radio remote host (RRH).

Figure 18:
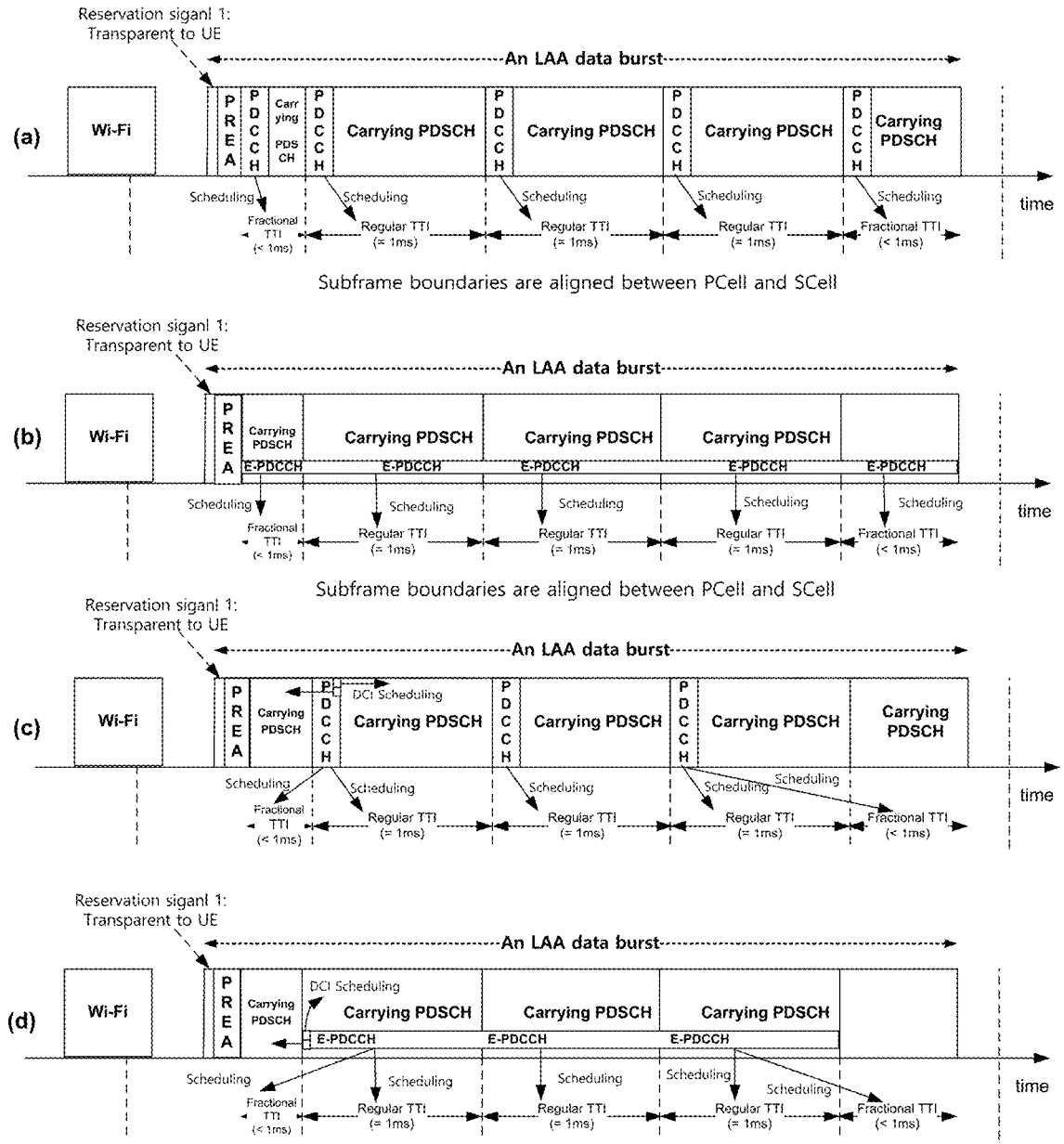
FIG. 18 shows a method of a base station to transmit a control channel for scheduling partial subframes after an LBT procedure in an unlicensed band according to an embodiment of the present invention.

FIG. 18 shows a method of a base station to transmit a control channel for scheduling partial a subframe after an LBT procedure in an unlicensed band according to an embodiment of the present invention. Specifically, FIG. 18 shows that the base station transmits one partial sub-frame at the start of transmission, transmits three general sub-frames, and transmits one partial sub-frame again after transmitting three general subframes.

The base station may transmit a control channel at each subframe transmitting data. Specifically, the base station may transmit PDCCH and EPDCCH for each subframe transmitting the PDSCH. At this time, the control channel may only schedule data transmitted on the same carrier as the carrier on which the control channel is transmitted. For example, the base station may transmit the self-carrier scheduling control channel as described above. In yet another embodiment, the control channel may also schedule data transmitted on a carrier different from the carrier on which the control channel is transmitted. For example, the base station may transmit a control channel for cross-carrier scheduling as described above. When the base station transmits data and control channels for scheduling data in the licensed band, the base station transmits control channels from the beginning of the subframe. However, when accessing a channel of a frequency band through a contention procedure like an unlicensed band, a base station may transmit partial subframes. When a base station transmits data through a partial subframe, it is a matter of how to transmit a control channel for scheduling data to be transmitted through a partial subframe by the base station.

A base station according to an embodiment of the present invention may transmit a control channel for scheduling data transmitted through a partial subframe, through a partial subframe. Specifically, the base station may transmit a control channel for scheduling data transmitted through a partial subframe before data transmission through a partial subframe. At this time, the control channel may be at least one of a PDCCH and an EPDCCH. For example, at the start of transmission, the base station may transmit a PDSCH after transmitting a preamble in a partial subframe and PDCCH for scheduling PDSCH, as in the embodiment of FIG. 18(a). At the end of the transmission, the base station may transmit the PDSCH after transmitting the PDCCH for scheduling the PDSCH in the partial subframe as in the embodiment of FIG. 18(a). Also, at the start of transmission, the base station may transmit a preamble in a partial subframe as in the embodiment of FIG. 18 (b) and start transmission of E-PDCCH for scheduling PDSCH. At the end of the transmission, the base station may simultaneously transmit E-PDCCH for scheduling PDSCH and PDSCH in a partial subframe as in the embodiment of FIG. 18(b).

In another embodiment, the base station may transmit a control channel for scheduling data transmitted through to the next subframe of the partial subframe or the previous subframe of the partial subframe. At this time, the base station does not transmit the control channel through the partial subframe. At this time, the control channel may be at least one of a PDCCH and an EPDCCH. In addition, the control channel may include an indicator indicating that data scheduled by the control channel is transmitted through the partial subframe. The DCI included in the PDCCH and the EPDCCH may include an indicator indicating that data scheduled by the PDCCH and the EPDCCH is transmitted through the partial subframe. For example, after transmitting a preamble and a PDSCH in a partial subframe, as in the embodiment of FIG. 18(c), at the start of transmission, the base station may transmit the PDCCH for scheduling the PDSCH transmitted in the partial subframe and the PDSCH transmitted through the corresponding subframe in the next subframe of the partial subframe. At the end of the transmission, the base station may transmit the PDCCH for scheduling the PDSCH transmitted in the partial subframe and the PDSCH transmitted in the corresponding subframe in the previous subframe of the partial subframe, as in the embodiment of FIG. 18(c). In addition, after transmitting a preamble and transmitting a PDSCH in a partial subframe, as in the embodiment of FIG. 18(d), at the start of transmission, the base station may transmit the E-PDCCH for scheduling the PDSCH transmitted in the partial subframe and the PDSCH transmitted through the corresponding subframe in the next subframe of the partial subframe. At the end of the transmission, the base station may transmit the E-PDCCH for scheduling the PDSCH transmitted in the partial subframe and the PDSCH transmitted in the corresponding subframe in the previous subframe of the partial subframe, as in the embodiment of FIG. 18(d).

As mentioned above, the base station may transmit a reservation signal or an initial signal before partial subframe transmission.

In the embodiment described above, the base station treats the partial subframe as a separate subframe. In another embodiment, the base station may treat the partial subframe and the other subframe as one subframe having a TTI value larger than the TTI value of a general subframe. For convenience of explanation, a subframe having a TTI value larger than a TTI value of a general subframe is referred to as an integrated subframe. In addition, a subframe having a general TTI value for distinguishing from the integrated subframe is referred to as a general subframe. A method of a base station to transmit the integrated subframe will be described with reference to FIG. 19.

Figure 19:
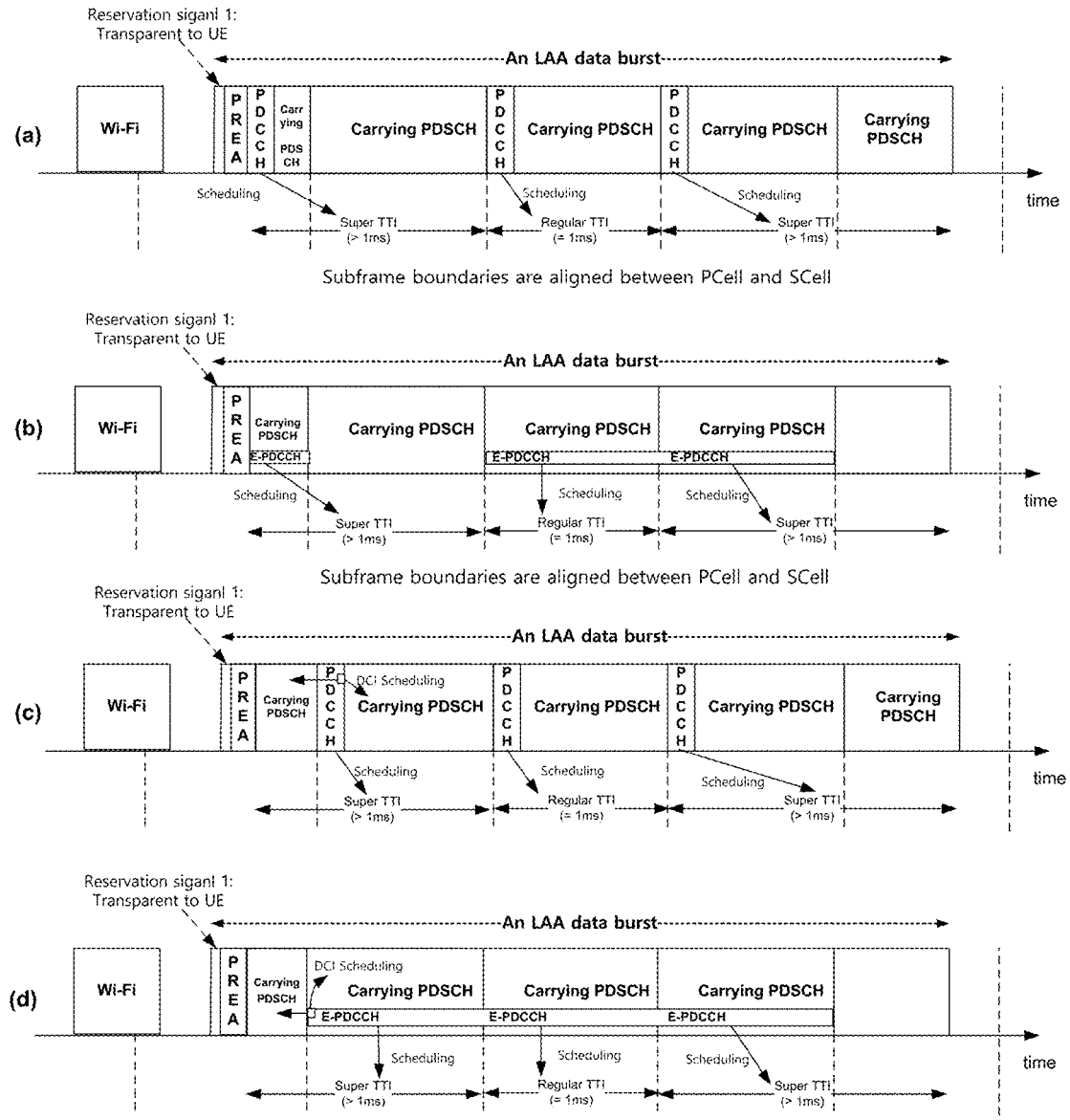
FIG. 19 shows a method of a base station to transmit a control channel for scheduling integrated subframes after an LBT procedure in an unlicensed band according to an embodiment of the present invention.

FIG. 19 shows a method of a base station to transmit a control channel for scheduling the integrated subframes after an LBT procedure in an unlicensed band according to an embodiment of the present invention. Specifically, FIG. 19 shows that the base station transmits one integrated subframe at the start of transmission, and then transmits one integrated subframe again after transmitting one general subframe.

A base station according to an embodiment of the present invention may transmit a control channel for scheduling data transmitted through an integrated subframe. Specifically, the base station may transmit a control channel for scheduling data transmitted through an integrated subframe before data transmission through an integrated subframe. At this time, the control channel may be at least one of a PDCCH and an EPDCCH. For example, at the start of transmission, the base station may transmit a PDSCH after transmitting a preamble in an integrated subframe and a PDCCH for scheduling the PDSCH transmitted in an integrated subframe as in the embodiment of FIG. 19(*a*). At the end of the transmission, the base station may transmit a PDSCH after transmitting the PDCCH for scheduling the PDSCH in the integrated subframe as in the embodiment of FIG. 19(*a*). Also, at the start of transmission, the base station may transmit a preamble in an integrated subframe as in the embodiment of FIG. 19 (*b*) and start transmission of E-PDCCH and PDSCH for scheduling PDSCH. At the end of the transmission, the base station may simultaneously transmit E-PDCCH and PDSCH for scheduling PDSCH in an integrated subframe as in the embodiment of FIG. 19(*b*). At this time, the size of the E-PDCCH may be changed according to the data scheduled by the E-PDCCH.

In another specific embodiment, the base station may transmit a control channel for scheduling data transmitted through an integrated subframe based on a boundary of a general subframe included in the integrated subframe. Specifically, the base station may transmit a control channel for scheduling data transmitted through an integrated subframe at a start time point of a general subframe included in the integrated subframe.

For example, at the start of transmission, the base station may transmit a preamble in the integrated subframe and start PDSCH transmission as in the embodiment of FIG. 19(*c*). At this time, the base station may transmit a PDCCH for scheduling the PDSCH transmitted through the integrated subframe at the start time point of the general subframe included in the integrated subframe. At the end of the transmission, the base station may transmit the PDSCH after transmitting the PDCCH for scheduling the PDSCH transmitted in the integrated subframe as in the embodiment of FIG. 19(*c*). In addition, at the start of transmission, the base station may transmit a preamble in the integrated subframe and start PDSCH transmission as in the embodiment of FIG. 19(*d*). At this time, the base station may transmit an E-PDCCH for scheduling the PDSCH transmitted through the integrated subframe from the start time point of the general subframe included in the integrated subframe. At this time, the size of the E-PDCCH may be changed according to the data scheduled by the E-PDCCH. At the end of the transmission, the base station may simultaneously transmit E-PDCCH for scheduling PDSCH transmitted in an integrated subframe and PDSCH as in the embodiment of FIG. 19(*d*).

The control channel described above may include an indicator indicating whether data to be scheduled by the control channel is transmitted through an integrated subframe or a general subframe. Specifically, the DCI included in the PDCCH or the E-PDCCH may include an indicator indicating whether the data scheduled by the PDCCH or the E-PDCCH is transmitted through the integrated subframe or the general subframe.

Through FIGS. 18 to 19, an embodiment is described in which a base station transmits a control channel in an unlicensed band on the basis of a boundary of a general subframe or a transmission start time point. A base station may transmit control channels at various time points within a subframe. An embodiment in which a base station transmits control channels at various time points within a subframe will be described with reference to FIGS. 20 to 22.

Figure 20:
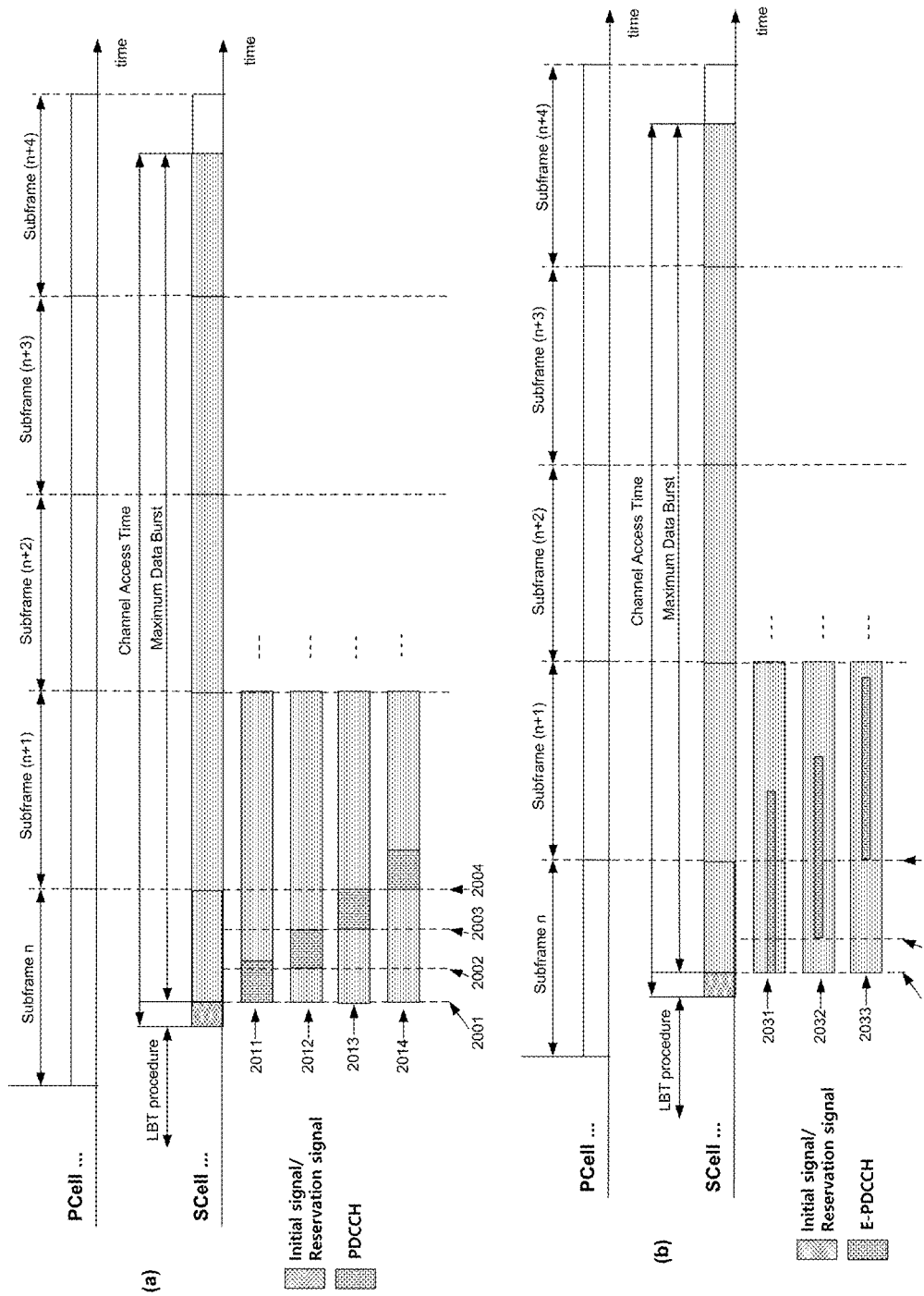
FIG. 20 shows another method of a base station to transmit a control channel for scheduling integrated subframes after an LBT procedure in an unlicensed band according to an embodiment of the present invention.

FIG. 20 shows another method of a base station to transmit a control channel for scheduling the integrated subframes after an LBT procedure in an unlicensed band according to an embodiment of the present invention.

The base station may transmit a control channel for scheduling data transmitted through the integrated subframe at the start of the transmission of the integrated subframe. For example, the base station may transmit the control channel at the start of the transmission of the integrated subframes 2001 and 2021 as in the first embodiments 2011 and 2031 of FIG. 20(*a*) and FIG. 20(*b*). At this time, the user equipment may receive the control channel first, and stop the data reception if the decoded control channel does not schedule the data corresponding to the user equipment. Also, the user equipment does not need to buffer the data transmitted to the other user equipment in advance. Therefore, at the start of transmission of the integrated subframe, the base station may increase the operation efficiency of the user equipment by transmitting a control channel for scheduling data transmitted through the integrated subframe.

As described above, the base station may access radio resources in the unlicensed band regardless of subframe boundaries. In a specific embodiment, the base station or user equipment may start transmission at any time point within the subframe in the unlicensed band. Therefore, when accessing the unlicensed band, the base station may transmit the signal for occupying the above-mentioned radio resource first. In a specific embodiment, the user equipment may monitor the signal to occupy the radio resource. If the user equipment senses a signal for occupying the radio resource, the user equipment may determine that the base station transmits data. Thus, by transmitting a signal for occupying the radio resource, the base station may prevent another wireless communication terminal from accessing radio communication resources before transmitting the control channel and data. In addition, the base station may inform the user equipment that the base station is starting data transmission. In addition, the base station may transmit a signal for occupying radio resources to match OFDM symbol units.

Accordingly, the base station may transmit a signal for occupying radio resources before the integrated subframe transmission. In this case, the user equipment must perform blind decoding of the control channel including control information for each OFDM symbol received until receiving the control channel. previously designated to transmit the reference signal. The base station may transmit the control channel from any one of the OFDM symbols previously designated to transmit the reference signal. At this time, as described above, the base station may transmit a signal for occupying radio resources and transmit the integrated subframe. The base station may adjust the duration of the signal for occupying the radio resources so that the start of transmission of the integrated subframe corresponds to one of the OFDM symbols previously designated to transmit the reference signal. Also, the reference signal may be a Cell Specific Reference Signal (CRS). Specifically, the reference signal may be CRS port 0 or CRS port 1. In addition, the index value of the OFDM symbol in which the CRS is transmitted may be at least one of 0, 4, 7, and 11. According to the operation of the base station, the user equipment may monitors the reception of the control channel from the OFDM symbol position previously designated to transmit the reference signal to receive the control information.

If the control channel is the E-PDCCH and the subframe boundaries of PCell and SCell match to each other, based on PCell's OFDM symbol index, the base station may transmit the E-PDCCH to an OFDM symbol position that does not split the downlink DMRS (demodulation reference signal). For example, the base station may transmit the E-PDCCH to an OFDM symbol position 2022 that does not split the DMRS, as in the second embodiment 2032 of FIG. 20(*b*). If the DMRS is split by the E-PDCCH, the user equipment may not use one DMRS port for decoding/demodulating the E-PDCCH. Specifically, the base station may transmit an E-PDCCH from an OFDM symbol that is not the sixth OFDM symbol of the first slot of the subframe and the sixth OFDM symbol of the second slot based on the normal CP. That is, the base station may transmit an E-PDCCH from any one OFDM symbol of the first OFDM symbol to the fifth OFDM symbol in the first slot of the subframe and the first OFDM symbol to the fifth OFDM symbol in the second slot, based on the normal CP. Also, the base station may adjust the duration of the signal for occupying the radio resources to transmit the E-PDCCH to an OFDM symbol position that does not split the downlink DMRS while transmitting the signal for occupying the above-described radio resource before the integrated subframe transmission. At this time, the user equipment may demodulate/decode a signal including the E-PDCCH for about a duration of a general subframe, and then determine whether to receive a PDSCH. Through this operation, the base station may improve the decoding/demodulation performance of the signal including the E-PDCCH of the user equipment.

In another embodiment, the base station may transmit a control channel and a reference signal together. Specifically, the base station may transmit a reference signal when transmitting a control channel. In yet another specific embodiment, the control channel may be transmitted from an OFDM symbol designated to transmit a reference signal. The user equipment estimates a state of a channel through which data and a control channel is transmitted by using a reference signal, and receives the control channel and the data to perform demodulation/decoding by using the estimated channel state. Therefore, when the base station transmits the control channel from the OFDM symbol designated to transmit the reference signal, the user equipment may stably receive the control channel. At this time, the reference signal may be a CRS as in the above-described embodiment. In addition, the index value of the OFDM symbol in which the reference signal is transmitted may be at least one of 0, 4, 7, and 11. The index value of the OFDM symbol in which the CRS is transmitted may be a predetermined value. For example, the base station may transmit the control channel at the positions 2002 and 2003 of the OFDM symbol for transmitting the reference signal as in the second and third embodiments 2012 and 2013 of FIG. 20(*a*).

In another embodiment, the base station may transmit a control channel in an OFDM symbol closest to a transmission start time point among a plurality of OFDM symbol indexes in which a reference signal is transmitted. In this embodiment, the base station may first transmit data scheduled by the control channel before transmitting the control channel. In another specific embodiment, the base station may adjust the length of the signal occupying the radio resource, and transmit the control channel before the data transmission scheduled by the control channel. In this case, the operation of the base station may be the same as the operation of the base station in the concrete embodiment described in the first embodiments 2011 and 2031 of FIGS. 20(*a*) and 20(*b*).

In another embodiment, the base station may transmit a control channel based on the boundary of the subframe. At this time, the boundary of the subframe is the boundary of the general subframe included in the integrated subframe, not the integrated subframe. Specifically, the base station may transmit the control channel at the start time point of the subframe. For example, the base station may transmit a control channel at the start time points 2004 and 2023 of the subframe as in the fourth embodiment 2014 of FIG. 20(*a*) and the third embodiment 2033 of FIG. 20(*b*). At this time, the base station may transmit data before transmitting the control channel for scheduling the data. Therefore, the user equipment may buffer the data until receiving the control channel.

The control channel described with reference to FIG. 20 may be used for both the above-described self-carrier scheduling and cross-carrier scheduling according to a specific embodiment. Further, in the embodiment described with reference to FIG. 20, the base station may transmit the PCell in a frequency band that is accessible without a contention procedure, for example, a license band.

In the embodiment described with reference to FIGS. 17 to 20, the boundary of the subframe of SCell is aligned with the subframe boundary of PCell. At this time, the base station had to transmit a partial subframe or an integrated subframe in the unlicensed band SCell. In the existing wireless communication system, it is assumed that resources are allocated and transmitted in units of subframes having a 1 ms length, for example. Therefore, when a base station and an user equipment transmit a partial subframe or an integrated subframe, the operations of the base station and the user equipment may be complicated. To solve this problem, the base station may set the start time point of the subframe based on the time point at which transmission starts in the unlicensed band SCell. Through this, the base station may transmit a general subframe at the start of transmission. This will be described in more detail with reference to FIG. 21.

Figure 21:
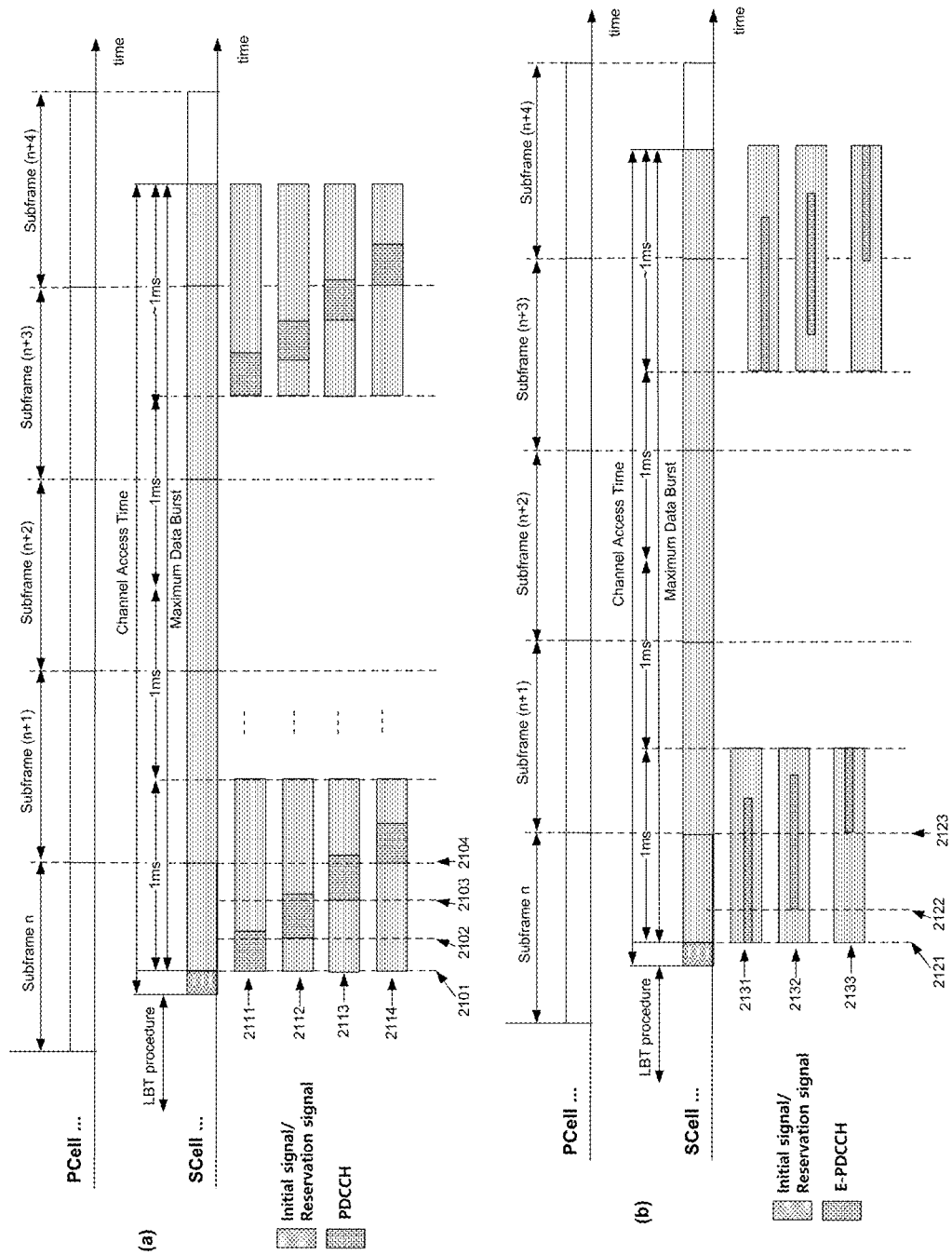
FIG. 21 shows a method of a base station to transmit a control channel for scheduling a subframe having a boundary different from a subframe of a PCell after the LBT procedure in the unlicensed band according to an embodiment of the present invention.

FIG. 21 shows a method of a base station to transmit a control channel for scheduling a subframe having a different boundary from a subframe of a PCell, after performing an LBT procedure in an unlicensed band according to an embodiment of the present invention.

As described above, the base station may set the transmission start time point of the SCell transmitted in the unlicensed band to the start time point of the SCell subframe. At this time, the time that the base station may occupy the radio resource may not be a multiple of the subframe length of the SCell. In this case, the base station may transmit the partial subframe at the end of the transmission. When the base station sets the transmission start time point of the SCell transmitted in the unlicensed band to the start time point of the SCell subframe, the base station may apply the embodiment described with reference to FIG. 20 based on the subframe boundary of the SCell.

Specifically, the base station may transmit a control channel for scheduling data to be transmitted through a subframe of SCell at the start of subframe transmission of the SCell. For example, the base station may transmit the control channel at the starts 2101 and 2121 of the transmission of the SCell subframes as in the first embodiments 2111 and 2131 of FIG. 21(*a*) and FIG. 21(*b*). At this time, the user equipment may receive the control channel first, and stop the data reception if the decoded control channel does not schedule the data corresponding to the user equipment. Also, the user equipment does not need to buffer the data transmitted to the other user equipment in advance. Therefore, at the start of transmission of the SCell subframe, the base station may increase the operation efficiency of the user equipment by transmitting a control channel for scheduling data transmitted through the SCell subframe.

At this time, the base station may transmit a signal for occupying radio resources before the SCell subframe transmission. In this case, the user equipment must perform blind decoding of the control channel including control information for each OFDM symbol received until receiving the control channel.

The base station may transmit the control channel from any one of the OFDM symbols previously designated to transmit the reference signal. At this time, as described above, the base station may transmit a signal for occupying radio resources and transmit the SCell subframe. The base station may adjust the duration of the signal for occupying the radio resources so that the start of transmission of the integrated subframe corresponds to one of the OFDM symbols previously designated to transmit the reference signal. Also, the reference signal may be a CRS. Specifically, the reference signal may be CRS port 0 or CRS port 1. In addition, the index value of the OFDM symbol in which the CRS is transmitted may be at least one of 0, 4, 7, and 11. According to the operation of the base station, the user equipment may receive the control information by monitoring the reception of the control channel from the OFDM symbol position previously designated to transmit the reference signal.

If the control channel is an E-PDCCH, the base station may transmit the E-PDCCH to an OFDM symbol position that does not split the downlink demodulation reference signal (DMRS) based on the OFDM symbol index of the PCell. For example, the base station may transmit the E-PDCCH to an OFDM symbol position 2132 that does not split the DMRS, as in the second embodiment 2122 of FIG. 21(*b*). If the DMRS is split by the E-PDCCH, the user equipment may not use one DMRS port for decoding/demodulating the E-PDCCH. Specifically, the base station may transmit an E-PDCCH from an OFDM symbol that is not the sixth OFDM symbol of the first slot of the PCell subframe and the sixth OFDM symbol of the second slot based on the normal CP. That is, the base station may transmit an E-PDCCH from any one OFDM symbol of the first OFDM symbol to the fifth OFDM symbol in the first slot of the PCell subframe and the first OFDM symbol to the fifth OFDM symbol in the second slot, based on the normal CP. Through this operation, the base station may improve the decoding/demodulation performance of the signal including the E-PDCCH of the user equipment.

In another embodiment, the base station may transmit a control channel and a reference signal together. Specifically, the base station may transmit a reference signal when transmitting a control channel. In yet another specific embodiment, the control channel may be transmitted from an OFDM symbol designated to transmit a reference signal. The user equipment estimates a state of a control channel and a channel through which data is transmitted using a reference signal, and demodulates/decodes the control channel and the data by using the estimated channel state.

Therefore, when the base station transmits the control channel from the OFDM symbol position to transmit the reference signal, the user equipment may stably receive the control channel. At this time, the reference signal may be a CRS as in the above-described embodiment. In addition, the index value of the OFDM symbol in which the reference signal is transmitted may be at least one of 0, 4, 7, and 11. The index value of the OFDM symbol in which the CRS is transmitted may be a predetermined value. For example, the base station may transmit the control channel at the positions 2102 and 2103 of the OFDM symbol for transmitting the reference signal as in the second and third embodiments 2112 and 2113 of FIG. 21(*a*).

In a specific embodiment, the base station may transmit a control channel in an OFDM symbol closest to a transmission start time point among a plurality of OFDM symbol indexes in which a reference signal is transmitted. In this embodiment, the base station may first transmit data scheduled by the control channel before transmitting the control channel. In another specific embodiment, the base station may adjust the length of the signal occupying the radio resource, and transmit the control channel before the data transmission scheduled by the control channel. In this case, the operation of the base station may be the same as the operation of the base station in the concrete embodiment described in the first embodiments 2111 and 2131 of FIGS. 21(*a*) and 21(*b*).

In another embodiment, the base station may transmit a control channel based on the boundary of the PCell subframe. Specifically, the base station may transmit the control channel on the SCell at the start time point of the PCell subframe. For example, the base station may transmit a control channel on the SCell at the start time points 2104 and 2123 of the PCell subframe as in the fourth embodiments 2014 and 2033 of FIG. 21(*a*) and FIG. 21(*b*). At this time, the base station may transmit data before transmitting the control channel for scheduling the data. Therefore, the user equipment may buffer the data until receiving the control channel.

The control channel described with reference to FIG. 21 may be used for both the above-described self-carrier scheduling and cross-carrier scheduling according to a specific embodiment. Further, in the embodiment described with reference to FIG. 21, the base station may transmit the PCell in a frequency band that is accessible without a contention procedure, for example, a license band.

As in the above-described embodiment, the base station may treat partial subframes as individual subframes in an SCell transmitted in an unlicensed band. At this time, a method of a base station to transmit a control channel will be described with reference to FIG. 22.

Figure 22:
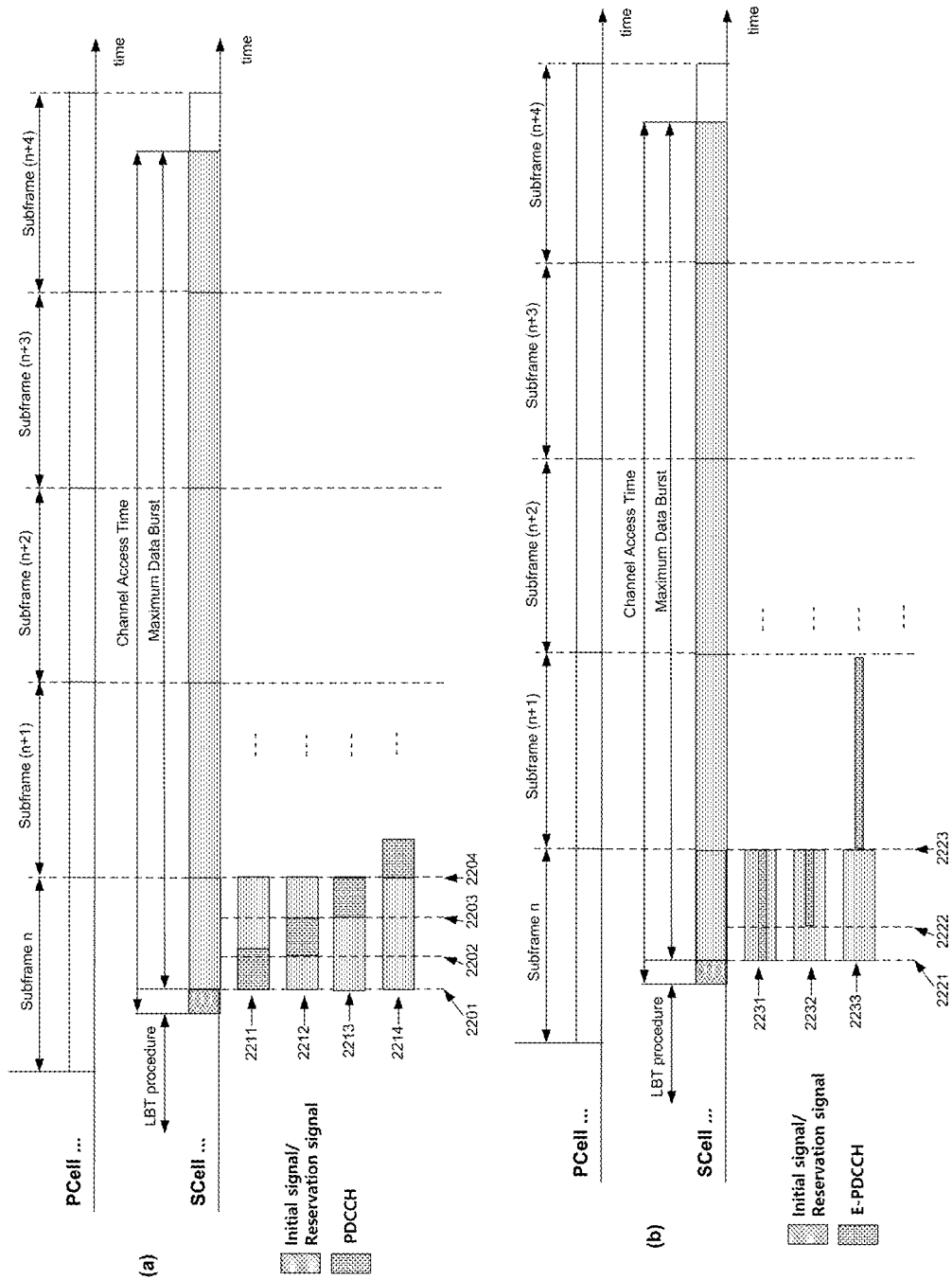
FIG. 22 shows another method of a base station to transmit a control channel for scheduling integrated subframes after an LBT procedure in an unlicensed band according to an embodiment of the present invention.

FIG. 22 shows another method of a base station to transmit a control channel for scheduling the partial subframes after an LBT procedure in an unlicensed band according to an embodiment of the present invention.

The base station may transmit a control channel for scheduling data transmitted through the partial subframe at the start of the transmission of the partial subframe. For example, the base station may transmit the control channel at the start of the transmission of the partial subframe 2211 and 2231 as in the first embodiment 2201 and 2221 of FIG. 22(*a*) and FIG. 22(*b*). At this time, the user equipment may receive the control channel first, and stop the data reception if the decoded control channel does not schedule the data corresponding to the user equipment. Also, the user equipment does not need to buffer the data transmitted to the other user equipment in advance. Therefore, at the start of transmission of the partial subframe, the base station may increase the operation efficiency of the user equipment by transmitting a control channel for scheduling data transmitted through the partial subframe.

The base station may transmit a signal for occupying radio resources before the integrated subframe transmission. In this case, the user equipment need to perform blind decoding of the control channel including control information for each OFDM symbol received until receiving the control channel.

The base station may transmit a control channel including control information from any one of the OFDM symbol positions previously designated to transmit the reference signal. At this time, as described above, the base station may first transmit a signal for occupying radio resources and transmit the partial subframe. The base station may adjust the duration of the signal for occupying the radio resources so that the start of transmission of the partial subframe corresponds to one of the OFDM symbol positions previously designated to transmit the reference signal. Also, the reference signal may be a CRS. Specifically, the reference signal may be CRS port 0 or CRS port 1. In addition, the index value of the OFDM symbol in which the CRS is transmitted may be at least one of 0, 4, 7, and 11. According to the operation of the base station, the user equipment may receive the control information by monitoring the reception of the control channel from the OFDM symbol position previously designated to transmit the reference signal.

If the control channel is the E-PDCCH and the subframe boundaries of PCell and SCell match to each other, based on PCell's OFDM symbol index, the base station may transmit the E-PDCCH to an OFDM symbol position that does not split the downlink DMRS (demodulation reference signal). For example, the base station may transmit the E-PDCCH to an OFDM symbol position 2222 that does not split the DMRS, as in the second embodiment 2232 of FIG. 22(b). If the DMRS is split by the E-PDCCH, the user equipment may not use one DMRS port for decoding/demodulating the E-PDCCH. Specifically, the base station may transmit an E-PDCCH from an OFDM symbol that is not the sixth OFDM symbol of the first slot of the subframe and the sixth OFDM symbol of the second slot based on the normal CP. That is, the base station may transmit an E-PDCCH from any one OFDM symbol of the first OFDM symbol to the fifth OFDM symbol in the first slot of the subframe and the first OFDM symbol to the fifth OFDM symbol in the second slot, based on the normal CP. Through this, the base station may improve the decoding/demodulation performance of the signal including the E-PDCCH of the user equipment.

In another embodiment, the base station may transmit a control channel and a reference signal together. Specifically, the base station may transmit a reference signal when transmitting a control channel. In yet another specific embodiment, the control channel may be transmitted from an OFDM symbol designated to transmit a reference signal. The user equipment estimates a state of a channel through which data and a control channel is transmitted by using a reference signal, and demodulates/decodes the control channel and the data by using the estimated channel state. Therefore, when the base station transmits the control channel and the reference signal together, the user equipment may stably receive the control channel. At this time, the reference signal may be a CRS as in the above-described embodiment. In addition, the index value of the OFDM symbol in which the reference signal is transmitted may be at least one of 0, 4, 7, and 11. The index value of the OFDM symbol in which the CRS is transmitted may be a predetermined value. For example, the base station may transmit the control channel at the positions 2202 and 2203 of the OFDM symbol for transmitting the reference signal as in the second and third embodiments 2212 and 2213 of FIG. 22(a).

In another embodiment, the base station may transmit a control channel from the OFDM symbol position closest to a transmission start time point among a plurality of OFDM symbol indexes in which a reference signal is transmitted. In this embodiment, the base station may first transmit data scheduled by the control channel before transmitting the control channel. In another specific embodiment, the base station may adjust the length of the signal occupying the radio resource, and transmit the control channel before the data transmission scheduled by the control channel. In this case, the operation of the base station may be the same as the operation of the base station in the concrete embodiment described in the first embodiments 2211 and 2231 of FIGS. 22(a) and 22(b).

In another embodiment, the base station may transmit a control channel based on the boundary of the subframe. At this time, the boundary of the subframe is the boundary of the general subframe, not the partial subframe. Specifically, the base station may transmit a control channel at a start time point of a general subframe positioned after a partial subframe. For example, the base station may transmit a control channel at the start time points 2204 and 2223 of a general subframe positioned next to a partial subframe, as in the fourth embodiments 2214 and 2233 of FIGS. 22(a) and 22(b). At this time, the base station may transmit data before transmitting the control channel for scheduling the data. Therefore, the user equipment may buffer the data until receiving the control channel.

The control channel described with reference to FIG. 22 may be used for both the above-described self-carrier scheduling and cross-carrier scheduling according to a specific embodiment. Further, in the embodiment described with reference to FIG. 22, the base station may transmit the PCell in a frequency band that is accessible without a contention procedure, for example, a license band.

The base station may change the transmission method of the control channel of the partial subframe at the start of transmission and the transmission method of the control channel of the partial subframe at the end of transmission in the embodiments described with reference to FIGS. 20 to 22. Specifically, the base station may apply the control channel transmission method described with reference to FIG. 20 to FIG. 22 differently to the partial subframe transmitted at the start of transmission and the partial subframe transmitted at the end of transmission.

Figure 23:
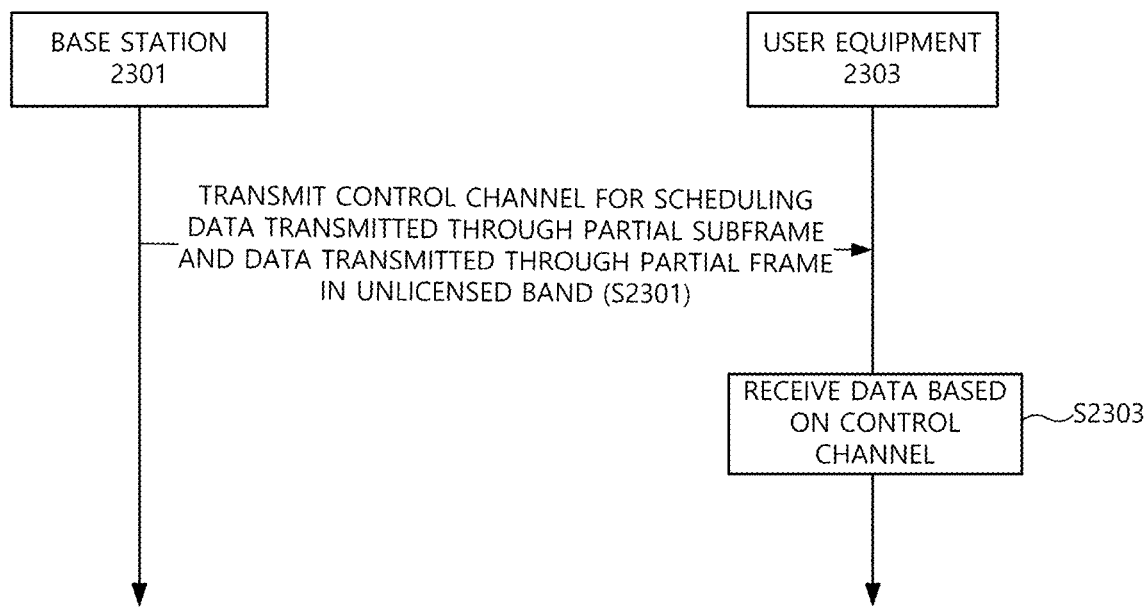
FIG. 23 shows operations of a base station and an user equipment according to an embodiment of the present invention.

FIG. 23 shows operations of a base station and an user equipment according to an embodiment of the present invention.

The base station 2301 transmits data to be transmitted through a subframe in an unlicensed band and a control channel for scheduling the data to be transmitted through a partial subframe (S2301). Before transmitting the partial subframe, the base station 2301 may perform the contention procedure in the unlicensed band. Specifically, an LBT procedure or a channel sensing procedure may be performed to access the unlicensed band.

Also, before transmitting the control channel, the base station 2301 transmits to the user equipment through the upper layer as a Radio Resource Control (RRC) parameter an indicator indicating whether or not the user equipment is required to set for receiving the partial subframe in the SCell.

The partial subframe is a partial subframe having a duration shorter than the duration of the subframe as described above. The base station 2301 may transmit the control channel along with the reference signal. Specifically, the base station 2301 may start transmission of a control channel for scheduling data transmitted through the partial subframe from a time point for transmitting an OFDM symbol including a reference signal. At this time, the control channel may schedule only data transmitted later than the control channel.

Also, the reference signal may be transmitted at a predetermined time point. At this time, the base station 2301 may start transmission of the control channel from the time point at which half of the duration of the subframe elapses from the boundary of the subframe. Specifically, when a normal CP in LTE is used, the base station 2301 may start transmission of a control channel from an OFDM symbol having an OFDM symbol index value of 7 in one subframe.

The reference signal may be a signal for estimating a channel state of a cell transmitted in an unlicensed band. Specifically, the reference signal may be the CRS described above.

Also, the base station 2301 may transmit a signal for occupying radio resources of an unlicensed band before starting the transmission of the control channel, as described above. At this time, the signal for occupying the radio resource may be at least one of the above-mentioned reservation signal, initial signal, LAA preamble, and DRS.

In addition, the base station 2301 may start transmission of the partial subframe at a time point other than the boundary of the subframe. At this time, the subframe boundary of the cell transmitted in the unlicensed band may be aligned with the subframe boundary of the cell of the license band.

In a specific embodiment, the base station 2301 may transmit control channels according to various embodiments described with reference to FIGS. 17 to 22.

The user equipment 2303 receives data transmitted through the partial subframe based on the control channel (S2303). Specifically, the user equipment may decode the control channel to receive data transmitted through the partial subframe.

In a specific embodiment, the user equipment 2303 may monitor the reception of a control channel that schedules data transmitted through the partial subframe from a time point for receiving an OFDM symbol including a reference signal.

In addition, the user equipment may receive an indicator indicating whether or not the user equipment is required to set up reception in the SCELL as a Radio Resource Control (RRC) parameter from the base station through the upper layer. At this time, the user equipment may monitor reception of a control channel for scheduling data transmitted through the partial subframe from a time point at which an OFDM symbol including a reference signal is received, based on the indicator indicating whether or not the user equipment is required to set up reception in the SCell.

The user equipment 2303 may receive the reference signal at a predetermined time point. At this time, the user equipment 2303 may monitor reception of a control channel from the time point at which half of the duration of the subframe elapses from the boundary of the subframe. When a normal CP in LTE is applied, the user equipment 2303 may monitor the reception of the control channel from the reception of an OFDM symbol having an OFDM symbol index of 7 in one subframe.

In a specific embodiment, the user equipment 2303 may receive the control channel according to the various embodiments described above with reference to FIGS. 17 to 22.

Also, the user equipment 2303 may ignore the signal received before the control channel. At this time, the signal received before the control channel may be a signal for occupying the radio resource described above. Specifically, the user equipment 2303 may ignore the signal received before the control channel in one subframe.

In addition, the control channel may support cross-carrier scheduling as well as self-carrier scheduling. The control channel may be any of the PDCCH and E-PDCCH described above, and the data may be PDSCH.

Embodiments of the invention described above may be applied not only to unlicensed bands but also to other frequency bands in which radio resources are used after a contention procedure.

Figure 24:
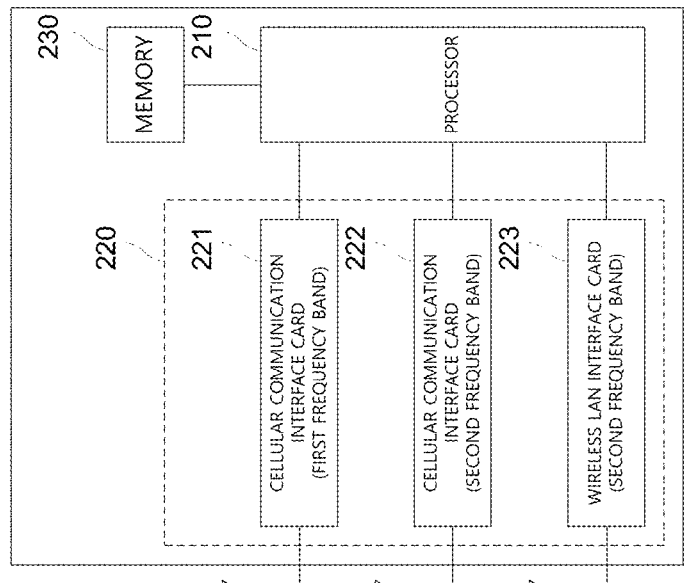
FIG. 24 illustrates a configuration of a user equipment and a base station according to an embodiment of the present invention.
Figure 24:
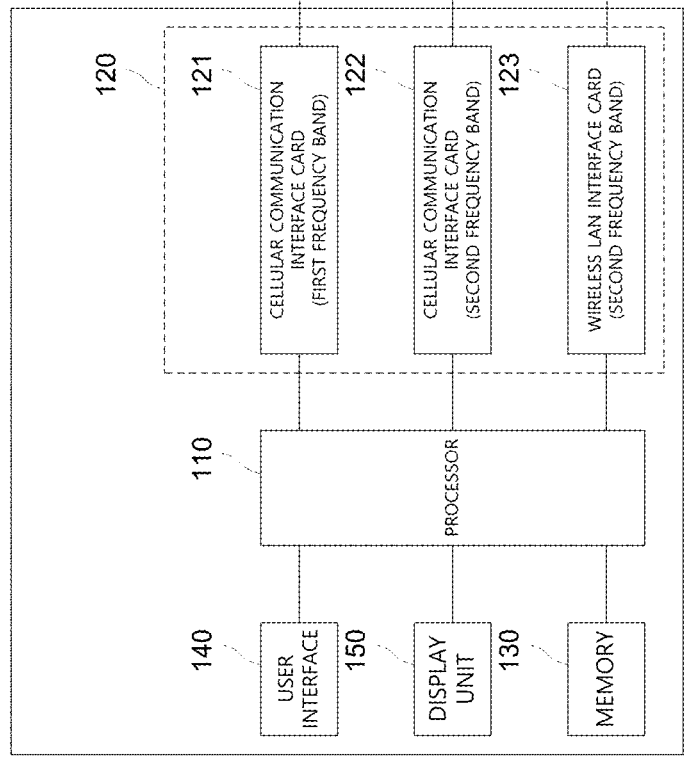

FIG. 24 illustrates a configuration of a user equipment and a base station according to an embodiment of the present invention. The embodiment of the present invention, the user equipment may be implemented by various types of wireless communication devices or computing devices that are guaranteed to be portable and mobility. The user equipment may be referred to as a station (STA), an Mobile Subscriber (MS), or the like. In the embodiment of present invention, the base station may control and manage a cell (eg, macrocell, femtocell, picosell, etc.) corresponding to a service area and perform function such as transmitting signal, designating channel, monitoring channel, self-diagnosis, relay. The base station may be referred to as an evolved NodeB (eNB), an access point (AP), or the like.

Referring to FIG. 24, the user equipment 100 may include a processor 110, a communication module 120, a memory 130, a user interface unit 140, and a display unit 150.

The processor 110 may execute various commands or programs according to the present invention and process data in the user equipment 100. Further, the processor 100 may control all operations of the respective units of the user equipment 100 and control data transmission/reception among the units. For example, the processor 110 may receive/process the downlink signal according to the proposal of the present invention.

The communication module 120 may be an integrated module that performs mobile communication using a mobile communication network and wireless LAN access using a wireless LAN. To this end, the communication module 120 may include a plurality of network interface cards such as cellular communication interface cards 121 and 122 and a wireless LAN interface card 123 in an internal or external type. In FIG. 24, the communication module 120 is illustrated as the integrated module, but the respective network interface cards may be independently disposed according to a circuit configuration or a purpose unlike FIG. 24.

The cellular communication interface card 121 transmits/receives a radio signal to/from at least one of a base station 200, an external device, and a server by using the mobile communication network and provides a cellular communication service at a first frequency band based on a command of the processor 110. The cellular communication interface card 121 may include at least one NIC module using an LTE-licensed frequency band. The cellular communication interface card 122 transmits/receives the radio signal to/from at least one of the base station 200, the external device, and the server by using the mobile communication network and provides the cellular communication service at a second frequency band based on the command of the processor 110. The cellular communication interface card 122 may include at least one NIC module using an LTE-unlicensed frequency band. For example, the LTE-unlicensed frequency band may be a band of 2.4 GHz or 5 GHz.

The wireless LAN interface card 123 transmits/receives the radio signal to/from at least one of the base station 200, the external device, and the server through wireless LAN access and provides a wireless LAN service at the second frequency band based on the command of the processor 110. The wireless LAN interface card 123 may include at least one NIC module using a wireless LAN frequency band. For example, the wireless LAN frequency band may be an unlicensed radio band such as the band of 2.4 GHz or 5 GHz.

The memory 130 stores a control program used in the user equipment 100 and various resulting data. The control program may include a program required for the user equipment 100 to perform wireless communication with at least one of the base station 200, the external device, and the server. The user interface 140 includes various types of input/output means provided in the user equipment 100. The display unit 150 outputs various images on a display screen.

Further, the base station 200 according to the exemplary embodiment of the present invention may include a processor 210, a communication module 220, and a memory 230.

The processor 210 may execute various commands or programs according to the present invention and process data in the base station 200. Further, the processor 210 may control all operations of the respective units of the base station 200 and control data and control channel transmission/reception among the units. For example, the processor 210 may transmit/process the downlink transmission of data and control channel according to the proposal of the present invention. For example, transmissions of data and control channel are performed according to the embodiments of the FIG. 17 to FIG. 23

The communication module 220 may be an integrated module that performs the mobile communication using the mobile communication network and the wireless LAN access using the wireless LAN like the communication module 120 of the user equipment 100. To this end, the communication module 120 may include a plurality of network interface cards such as cellular communication interface cards 221 and 222 and a wireless LAN interface card 223 in the internal or external type. In FIG. 24, the communication module 220 is illustrated as the integrated module, but the respective network interface cards may be independently disposed according to the circuit configuration or the purpose unlike FIG. 24.

The cellular communication interface card 221 transmits/receives the radio signal to/from at least one of the user equipment 100, the external device, and the server by using the mobile communication network and provides the cellular communication service at the first frequency band based on a command of the processor 210. The cellular communication interface card 221 may include at least one NIC module using the LTE-licensed frequency band. The cellular communication interface card 222 transmits/receives the radio signal to/from at least one of the user equipment 100, the external device, and the server by using the mobile communication network and provides the cellular communication service at the second frequency band based on the command of the processor 210. The cellular communication interface card 222 may include at least one NIC module using the LTE-unlicensed frequency band. The LTE-unlicensed frequency band may be the band of 2.4 GHz or 5 GHz.

The wireless LAN interface card 223 transmits/receives the radio signal to/from at least one of the user equipment 100, the external device, and the server through the wireless LAN access and provides the wireless LAN service at the second frequency band based on the command of the processor 210. The wireless LAN interface card 223 may include at least one NIC module using the wireless LAN frequency band. For example, the wireless LAN frequency band may be the unlicensed radio band such as the band of 2.4 GHz or 5 GHz.

In FIG. 24, blocks of the user equipment and the base station logically divide and illustrate elements of the device. The elements of the device may be mounted as one chip or a plurality of chips according to design of the device. Further, some components of the user equipment 100, that is to say, the user interface 140 and the display unit 150 may be selectively provided in the user equipment 100. Further, some components of the base station 200, that is to say, the wireless LAN interface 223, and the like may be selectively provided in the base station 200. The user interface 140 and the display unit 150 may be additionally provided in the base station 200 as necessary.

The method and the system of the present invention are described in association with the specific embodiments, but some or all of the components and operations of the present invention may be implemented by using a computer system having a universal hardware architecture.

The description of the present invention is used for illustration and those skilled in the art will understand that the present invention can be easily modified to other detailed forms without changing the technical spirit or an essential feature thereof. Therefore, the aforementioned exemplary embodiments are all illustrative in all aspects and are not limited. For example, each component described as a single type may be implemented to be distributed and similarly, components described to be distributed may also be implemented in a combined form.

The scope of the present invention is represented by the claims to be described below rather than the detailed description, and it is to be interpreted that the meaning and scope of the claims and all the changes or modified forms derived from the equivalents thereof come within the scope of the present invention.

The invention claimed is:

1. A base station of a wireless communication system, the base station comprising:
  a communication module; and
  a processor,
  wherein the processor is configured to:
  transmit a radio frame divided into a plurality of subframes by using the communication module, wherein a duration of each of the plurality of subframes is 1 ms,
  transmit a radio resource control (RRC) signaling which indicates that a user equipment is required to set up for receiving a partial subframe having a duration shorter than the duration of each of the plurality of subframes in an unlicensed serving cell, and
  when the base station transmits a control channel for scheduling data transmitted on the partial subframe in the unlicensed serving cell, start to transmit the control channel at an Orthogonal Frequency Division Multiplexing (OFDM) symbol position at which half of the duration of each of the plurality of subframes elapses from a boundary of one of the plurality of subframes,
  wherein the OFDM symbol position at which half of the duration of each of the plurality of subframes elapses from the boundary of one of the plurality of subframes is one of a plurality of OFDM symbol positions for transmitting a reference signal.

2. The base station of claim 1, wherein the processor is configured to start to transmit the partial subframe at an OFDM symbol position other than the boundary of each of the plurality of subframes.

3. The base station of claim 2, wherein the control channel schedules only data transmitted later than the control channel.

4. The base station of claim 3, wherein the processor is configured to transmit at least one of the plurality of subframes in consecutive to the partial subframe.

5. The base station of claim 1, wherein the reference signal is a signal for estimating a channel state of a cell in which the partial subframe is transmitted.

6. The base station of claim 1, wherein the processor is configured to transmit a signal for occupying a radio resource before starting to transmit the control channel.

7. The base station of claim 6, wherein the signal for occupying the radio resource indicates that the transmission of the base station starts.

8. A user equipment of a wireless communication system, the user equipment comprising:
a communication module; and
a processor,
wherein the processor is configured to:
receive a radio frame divided into a plurality of subframes by using the communication module, wherein a duration of each of the plurality of subframes is 1 ms, and
when the user equipment receives a radio resource control (RRC) signaling which indicates that the user equipment is required to set up for receiving a partial subframe in an unlicensed serving cell, monitor, in the unlicensed serving cell, both a control channel starting at a boundary of one of the plurality of subframes and a control channel starting at Orthogonal Frequency Division Multiplexing (OFDM) symbol position at which half of the duration of each of the plurality of subframes elapses from the boundary of one of the plurality of subframes,
wherein the OFDM symbol position at which half of the duration of each of the plurality of subframes elapses from the boundary of one of the plurality of subframes is one of a plurality of OFDM symbol positions for receiving a reference signal, and
wherein the partial subframe has a duration shorter than the duration of each of the plurality of subframes.

9. The user equipment of claim 8, wherein the processor is configured to start to receive the partial subframe at an OFDM symbol position other than the boundary of each of the plurality of subframes.

10. The user equipment of claim 9, wherein the control channel schedules only data transmitted later than the control channel.

11. The user equipment of claim 10, wherein the processor is configured to receive at least one of the plurality of subframes in consecutive to the partial subframe.

12. The user equipment of claim 8, wherein the reference signal is a signal for estimating a channel state of a cell in which the partial subframe is transmitted.

13. The user equipment of claim 8, wherein when the user equipment receives the partial subframe, the processor is configured to ignore a signal received prior to the control channel.

14. The user equipment of claim 8, wherein the control channel schedules data transmitted from a cell other than a cell in which the control channel is transmitted.

15. A method of operating a user equipment of a wireless communication system, the method comprising:
receiving a radio frame divided into a plurality of subframes, wherein a duration of each of the plurality of subframes is 1 ms,
wherein the receiving of the radio frame comprises
when the user equipment receives a radio resource control (RRC) signaling which indicates that the user equipment is required to set up for receiving a partial subframe in an unlicensed serving cell, monitoring, in the unlicensed serving cell, both a control channel starting at a boundary of one of the plurality of subframes and a control channel starting at Orthogonal Frequency Division Multiplexing (OFDM) symbol position at which half of the duration of each of the plurality of subframes elapses from the boundary of one of the plurality of subframes,
wherein the OFDM symbol position at which half of the duration of each of the plurality of subframes elapses from the boundary of one of the plurality of subframes is one of a plurality of OFDM symbol positions for receiving a reference signal, wherein the partial subframe has a duration shorter than the duration of each of the plurality of subframes.

* * * * *